US012591453B2

(12) United States Patent
Kothiwale et al.

(10) Patent No.: US 12,591,453 B2
(45) Date of Patent: Mar. 31, 2026

(54) METHOD AND SYSTEM FOR MULTI-CORE LOAD SCHEDULING IN AN OPERATING SYSTEM (OS) LESS COMMUNICATION NETWORK

(71) Applicant: SAMSUNG ELECTRONICS CO., LTD., Suwon-si (KR)

(72) Inventors: Mahantesh Kothiwale, Bangalore (IN); Aneesh Deshmukh, Bangalore (IN); Jitender Singh Shekhawat, Bangalore (IN); Nayan Ostwal, Bangalore (IN); Nitin Anand, Bangalore (IN); Srinivasa Rao Kola, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 773 days.

(21) Appl. No.: 17/963,716

(22) Filed: Oct. 11, 2022

(65) Prior Publication Data

US 2023/0110930 A1      Apr. 13, 2023

(30) Foreign Application Priority Data

Oct. 11, 2021   (IN) .............................. 202141046320
Oct. 7, 2022    (IN) .............................. 202141046320

(51) Int. Cl.
    *G06F 9/48*          (2006.01)
(52) U.S. Cl.
    CPC .................................. *G06F 9/4881* (2013.01)
(58) Field of Classification Search
    None
    See application file for complete search history.

(56) References Cited

U.S. PATENT DOCUMENTS 8,296,773 B2    10/2012  Bose et al.
2009/0007133 A1*  1/2009  Paul ...................... G06F 9/5083
                                              718/105
(Continued)

FOREIGN PATENT DOCUMENTS

CN        106713185        5/2017
CN        107209548        4/2021
(Continued)

OTHER PUBLICATIONS

J. F. Martinez and E. Ipek, "Dynamic Multicore Resource Management: A Machine Learning Approach," in IEEE Micro, vol. 29, No. 5, pp. 8-17, Sep.-Oct. 2009 (Year: 2009).*

(Continued)

*Primary Examiner* — Frank D Mills
(74) *Attorney, Agent, or Firm* — NIXON & VANDERHYE P.C.

(57)          ABSTRACT

A method and system for multi-core load scheduling in an operating system (OS) less communication network is disclosed. The method comprises initializing a plurality of threads for processing corresponding functionalities of incoming packets. The method further comprises synchronizing the plurality of initialized threads with each other for simultaneous processing of the one or more incoming packets. The method further comprises determining central processing unit (CPU) load on each of the plurality of cores and an ingress data-rate of one or more incoming data packets. The method further comprises enabling or disabling at least one flag based on the determined load and the ingress data-rate and determining at least one thread based on the enabled flag by the RL agent. The method further comprises processing the corresponding functionalities associated with the one or more incoming packets based on the at least one determined thread.

18 Claims, 21 Drawing Sheets

(56)                References Cited

U.S. PATENT DOCUMENTS

| | | | |
|---|---|---|---|
| 2009/0249352 A1* | 10/2009 | Hohensee | G06F 9/5088 |
| | | | 718/105 |
| 2014/0052965 A1 | 2/2014 | Sarel | |
| 2016/0239074 A1 | 8/2016 | Lee et al. | |
| 2018/0203744 A1 | 7/2018 | Wiesmaier et al. | |
| 2019/0286483 A1* | 9/2019 | Chitnis | G06F 9/4887 |
| 2021/0075730 A1* | 3/2021 | Palermo | H04L 47/6275 |
| 2022/0200932 A1* | 6/2022 | Tsiaflakis | H04L 47/6215 |
| 2023/0205606 A1* | 6/2023 | Palermo | G06F 9/5072 |
| | | | 718/104 |

FOREIGN PATENT DOCUMENTS

| | | |
|---|---|---|
| JP | 6072834 | 2/2017 |
| WO | 2016/057817 | 4/2016 |

OTHER PUBLICATIONS

S. Bezzubtsev et al., "An Approach to the Construction of a Network Processing Unit," 2018 International Scientific and Technical Conference Modern Computer Network Technologies (MoNeTeC), Moscow, Russia, 2018, pp. 1-12 (Year: 2018).*
Indian Office Action issued Sep. 13, 2023 in corresponding Indian Patent Application No. 202141046320.
Kapoor et al. , "Chronos: Predictable Low Latency for Data Center Applications", SoCC '12, Oct. 14-17, 2022, 14 pages.

\* cited by examiner

702

706

Processing Unit

708

Memory

710

Communicating unit

712

Display Screen

704

714

Multi- Core Processing Unit

716

RL agent 718-1

RT thread

. . . . .

718-n

RT thread

720

Memory Unit

722

Communication unit

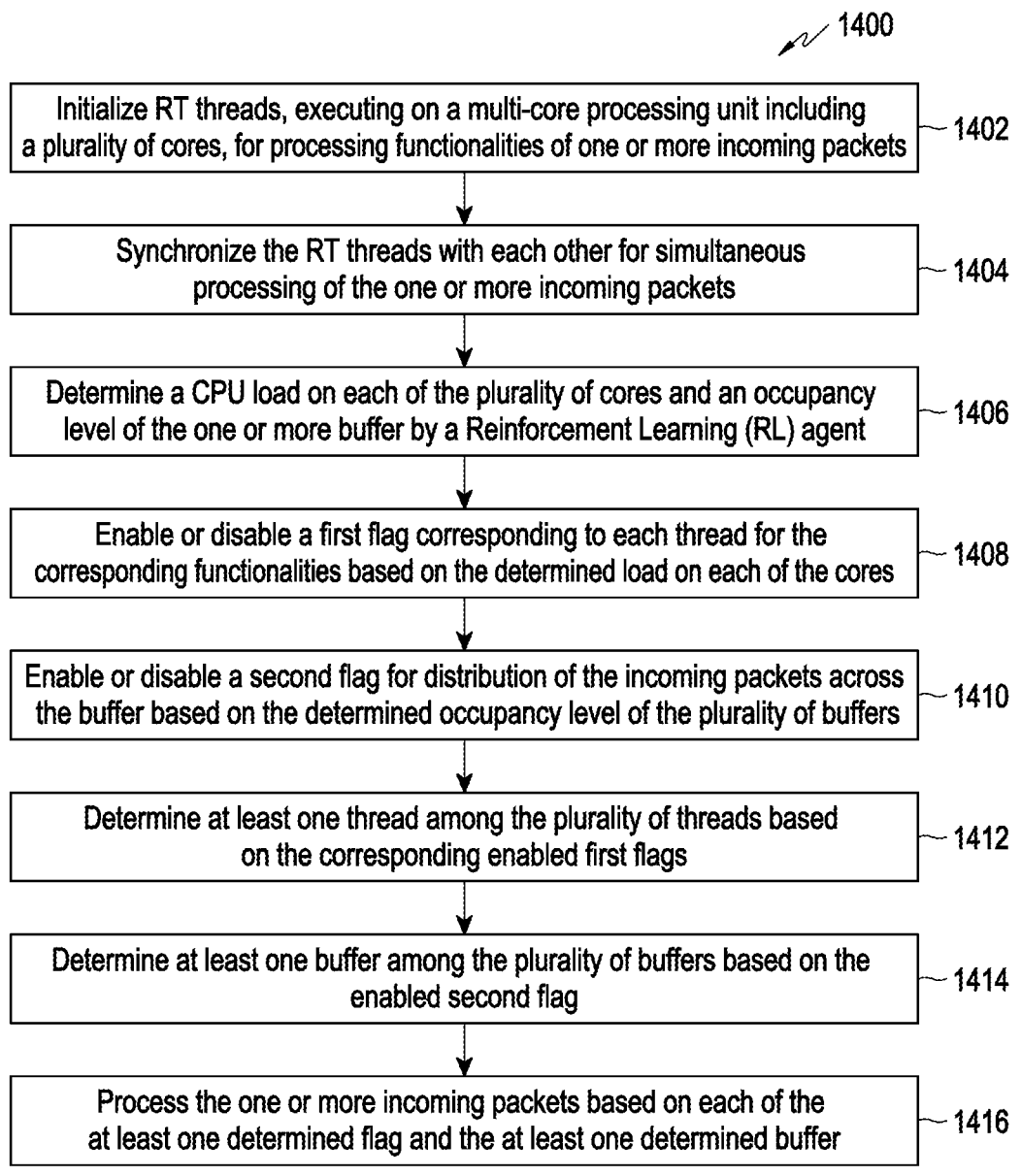

1400

Initialize RT threads, executing on a multi-core processing unit including a plurality of cores, for processing functionalities of one or more incoming packets — 1402

Synchronize the RT threads with each other for simultaneous processing of the one or more incoming packets — 1404

Determine a CPU load on each of the plurality of cores and an occupancy level of the one or more buffer by a Reinforcement Learning (RL) agent — 1406

Enable or disable a first flag corresponding to each thread for the corresponding functionalities based on the determined load on each of the cores — 1408

Enable or disable a second flag for distribution of the incoming packets across the buffer based on the determined occupancy level of the plurality of buffers — 1410

Determine at least one thread among the plurality of threads based on the corresponding enabled first flags — 1412

Determine at least one buffer among the plurality of buffers based on the enabled second flag — 1414

Process the one or more incoming packets based on each of the at least one determined flag and the at least one determined buffer — 1416

FIG.14

METHOD AND SYSTEM FOR MULTI-CORE LOAD SCHEDULING IN AN OPERATING SYSTEM (OS) LESS COMMUNICATION NETWORK

CROSS-REFERENCE TO RELATED APPLICATIONS

This application is based on and claims priority under 35 U.S.C. § 119 to Indian Provisional Patent Application No. 202141046320 filed on Oct. 11, 2021 in the Indian Patent Office, and Indian Complete Patent Application No. 202141046320 filed on Oct. 7, 2022, in the Indian Patent Office, the disclosures of all of which are incorporated by reference herein their entireties.

BACKGROUND

Field

The disclosure relates to a method and system for load scheduling of processing cores during packet processing in a wireless network and for example to the method and system for reinforcement learning (RL) based on multi-core load scheduling on operation system (OS) less bare-metal communication network.

Description of Related Art

In recent years, improvement in the various functionalities of different wireless communication systems has become increasingly important as various network operators want improved performance in a cost-efficient manner.

The 3GPP next generation radio access network (NG-RAN) includes base stations or gNBs, which facilitates wireless connectivity to the user equipment's (UEs) through the new radio (NR) protocol stack. For the ease of explanation herein, the base station is referred as gNBs throughout the disclosure without deviating from the scope of the disclosure. From a functional viewpoint, a gNB includes distributed units (DUs) and a centralized unit (CU). The CU provides support for the higher layers of the protocol stack such as service data adaptation protocol (SDAP), packet data convergence protocol (PDCP), and radio resource control (RRC) while DUs provide support for the lower layers of the protocol stack such as radio link control (RLC), medium access control (MAC) and physical layer. In general, the gNB has multiple cores for each functionality, to cater to different users. For example, PDCP cores, RLC cores, MAC cores, and functional application platform interface (FAPI) cores. Each core can handle the data for multiple users, but at a time for a specific user, the data is always processed on an assigned core. Each of these cores handles packet processing threads. Each of these threads runs an instance of forwarding software. Some of those threads need to meet the real-time boundaries which can be referred to as real time threads (RT threads) and some can have a more time-relaxed operation referred to as non-real time threads (NRT threads). Various approaches may be used to distribute packets to the packet processing threads. One approach is to pipeline the packet processing threads across layers of packet processing (such as across the PDCP, RLC, MAC, and FAPI) with the help of parallel processing architecture to process various functionalities of any packets. The various functionalities include the processing of various stages of the packets. An example of the parallel processing architecture is shown in FIG. 1 of the drawings, according to a conventional art. FIG.

1 illustrates an incoming port to receive one or more incoming packets from a plurality of UEs. The packet distributor module allocates incoming data packets from each of the plurality of UEs to the corresponding core in accordance with static logic for processing the data packets. As an example, the incoming data packets from a user equipment 1 (UE #1) are assigned to the dedicated cores, as illustrated in FIG. 1. Similarly, the incoming data packets from a user equipment 4 (UE #4) are allocated to the dedicated cores for UE #4, as illustrated in FIG. 1.

The packet processing threads run in bare-metal mode and are isolated from the OS Scheduling. In Bare-metal mode, the base stations or gNBs are configured to run without the OS intervention for reducing overhead in overall processing by eliminating a plurality of additional tasks, such as context switching, thread scheduling, interrupt processing, etc. performed by the OS. Also, in this scenario, in absence of scheduling of packets by the OS, the central processing unit (CPU) cores always run at maximum constant clock frequency for processing the packets. As a result, an OS scheduler cannot intervene in packet processing threads execution, and also core idle time cannot be detected. The packet processing threads in isolation of OS scheduling or intervention in the Bare-metal mode are conventional in the art. However, the packets are processed by a predefined set of rules by threads configured in the cores of the multi-core processing unit.

An example of a single core multi-thread processing system is shown in FIG. 2A of the drawings, according to a conventional art. Each of the multiple threads runs at any given point of time by the single core, and such multiple threads process in a sequential manner. Thus, once processing of Thread #1 is completed, thread switching is required to execute processing of Thread #2 operations by the corresponding core. Therefore, the thread switching requires a thread switching time, which is performed by the OS. In this scenario, the thread switching time is overhead.

An example of a multi-core multi-thread processing system is shown in FIG. 2B of the drawings, according to a conventional art. Each thread runs on a single core of the multi-core processing unit. Each of the threads in the core is configured to run in parallel to process the incoming data packets. Therefore, in this scenario, the thread switching time is not required and the execution of processes is N times faster than the single core multi-thread processing system. N is the number of cores in the multi-core processing system.

An example of parallel execution for a data decomposition system is shown in FIG. 3 of the drawings, according to a conventional art. As per FIG. 3, the incoming data packets received from a communication port (Ex: ethernet port) are segregated based on a 'rule' and placed into individual buffers or queues. Each buffer/queue is read by a dedicated CPU core for performing the 'packet processing' of the incoming data packets. With an example given in FIG. 3, at any given point in time, the 'packet processing' of four incoming data packets can execute in parallel in four different cores. These packets are segregated per UE basis and each UE has multiple cores for handling different pipelined stages within one UE's packets. Such data decomposition to route packets of a particular UE to a particular set of processing cores is statically configured. Such static configuration does not allow the route of more than one UE's packets to the same set of pipelined functional decomposed processing cores. In lower data throughput conditions, the opportunity of shutting down a few cores or an opportunity to equally load the available set of cores for All UEs is lost due to static configuration.

An example of parallel execution for a functional decomposition system is shown in FIG. 4 of the drawings, according to the conventional art. In this scenario, each of the multiple stages or functionalities within the "packet processing" is split and assigned to a dedicated core. As shown in FIG. 4, the communication port (Ex: ethernet port) receives the incoming data packets. Further, each core of the multi-core processing unit processes a dedicated stage or functionality of each of the incoming data packets only. For example, CPU core #1 is configured to process only stage #1 of each incoming data packet. Similarly, CPU core #2 is configured to process only stage #2 of each incoming data packet. In this way, the system achieves parallelism when the execution of different stages of each incoming packet is executed by N different cores.

An example of parallel execution for data decomposition and functional decomposition system is shown in FIG. 5 of the drawings, according to the conventional art. As per the example shown in FIG. 5, the communication port (ethernet port) receives the incoming packets from the UEs. The incoming packets are segregated based on a defined "rule" and placed in the corresponding buffer of different cores. Subsequently, the incoming packets are further decomposed functionally in plurality stages, such as PDCP, RLC, MAC, and FAPI along with packet egress. The incoming data packets placed into the corresponding buffer are processed by a plurality of cores. Each core is responsible for processing each stage of the plurality of stages of the incoming data packet of any particular user. As shown in FIG. 5, four cores are configured for processing four stages of PDCP, RLC, MAC, and FAPI of incoming data packets from UE #1, in which each core is responsible to execute any specific stage of the incoming data packets of UE #1. Similarly, four cores are configured to process data stages of the incoming data packet from UE #2. Any given core handles a specific stage of the incoming data packet from UE #2. The system increases throughput by parallelly executing the incoming data packets from UEs along with stages of those incoming data packets. The system for combined data decomposition and functional decomposition is typically adapted in most of the high speed packet processing systems (specifically in 5G and beyond Base Station's packet processing).

For high-speed incoming data packet processing in the gNB, the core is configured for only one thread to process at least one stage out of the plurality of stages of corresponding functionalities of the incoming data packet. The thread is typically the smallest unit scheduled and executed on the core of the CPU for processing any instruction scheduled for the corresponding core. As the thread runs dedicatedly on the core of the CPU for the execution of the incoming data packets, the OS does not intervene in the packet processing event by sending an 'interrupt' for context switching. But the OS is responsible for polling the 'incoming' data packets on a packet buffer of the core for processing by the thread configured on the core. Thus, the thread with no overheads, such as 'OS intervention', and 'interrupt latency' is now referred to as 'RT thread' (real time thread). Thus, the RT thread and the CPU core executing it are 'Isolated' from OS (called 'task isolated' thread). For polling of incoming packets, the threads run continuously in a loop, to poll and process the packet's intended stage. Such RT thread execution is called 'OS less bare-metal execution'.

An example of a flowchart of thread execution in 'OS less bare-metal execution' is shown in FIG. 6A of the drawings, according to a conventional art. The 'OS less bare-metal execution' starts from invoking a plurality of threads in one or more cores of the multi-core processing unit for processing one or more incoming packets from UEs. The invoking of threads is initialized at the time of system boot up. At operation 602, RT threads are initialized by the core. In the initialization process, necessary memory is allocated for executing the initialized RT thread. The thread to core CPU mapping is also executed in the initialization process. The initialization of threading can be single-thread initialization or multi-thread initialization. In single-thread initialization, each core of the processing unit is configured to run in a single thread. However, in the multi-thread initialization, two or more threads are configured to run by each core of the multi-core processing unit, in which the two or more threads execute independently while sharing the same processing resource. The threads are waiting for each other for the completion of the initialization process for each of the threads. At operation 604, once the initialization process is completed, the threads are synchronized to run parallelly in the plurality of cores of the multi-core processing unit. The threads are synchronized for processing the incoming packets from UEs. The threads are also initialized to ascertain the type of functionalities or stages of the incoming packets to be processed by each thread. At operation 606, the threads initiate a polling process for receiving packets to process the particular functionality or stage for which each of the threads is initialized. The polling process runs constantly in a continuous loop for receiving packets of the particular stage and proceeding to the next operation 608. The polling process is always active even when there are no packets to process. In operation 608, the polling process detects either any packet in the corresponding buffer/queue or a completion message of the prior stage completion process of the incoming packets. Therefore, based on the initialization of the threads, the threads initialize the polling process to ascertain particular functionality or stage. As an example, thread X is configured to run in the core for processing all incoming packets from UE #1. Thus, thread X polls on the packet buffer of UE #1 waiting for any incoming packets from UE #1, and thread X receives the packet for processing once there is any incoming packet in the packet buffer of UE #1. Similarly, thread Y polls for a message from the previous stage's thread on a queue. Thus, in this case, the thread Y polls for the particular functionality or stage to be processed. So, once the processing of the previous stage is complete, thread Y receives the incoming packet to process the next stage. In operation 610, the thread processes the packets upon detecting the packets either in the buffer/queue or by receiving the completion message. In operation 612, the thread transmits the completion message once the processing of the stage is completed by the thread. For example, if thread X is configured to process all stages of incoming packets from UE #1, then the thread X transmits a message to the CPU upon completion of processing of the incoming packet. In another example, if thread Y is configured to process of PDCP stage of the incoming packet from UE #1, the thread Y transmits the completion message to the next thread upon completion of the PDCP stage of the incoming packet. Upon completion of processes, in operation 614, the thread execution is completed in the event of an exception/ user request/OS request to stop thread processing. Subsequently, the thread releases all memory, processing unit, and all other allocations for enabling the CPU core to reallocate/ reinitialize the threads. Since the thread execution in the CPU core is isolated from OS to avoid any OS intervention overhead, the OS does not have any chance to monitor the load on the CPU core and reduce the clock rate of the CPU core. Therefore, in case of low or no incoming packet-rate, unnecessary power is consumed by the CPU core as the CPU core runs continuously at high frequency.

An example of execution of voice over internet (VoIP) calls in 'OS less bare-metal execution' is shown in FIG. 6B of the drawings, according to a conventional art. A VoIP call requires a low data rate, compared to a video streaming (or file download). However, in all cases, the thread runs at the same higher clock rates in all clock cycles. As OS does not have any intervention in bare-metal execution, therefore, the 'OS less bare-metal execution' lacks control on load scheduling within the threads in case of low data rate in all the threads. In this scenario, the threads, thread #1, thread #2, thread #3, and thread #4 are configured to run in each core for processing stage #1, stage #2, stage #3, and stage #4, respectively, of any incoming data packet. The user request for a VOIP call requires low data processing at the thread. Thus, the CPU load is low for each thread execution, whereas the clock rate is high although user request requires low data processing requirement. In case of such a low data-rate scenario, with OS less Bare-metal execution, in which the RT thread/CPU core is isolated from OS, the OS is unable to migrate all stages processing in four (4) threads to a single core to free up (or to push in idle mode) remaining (e.g., three) cores for power saving. Thus, power consumption remains high, although the requirement to process incoming data is low.

Therefore, in absence of OS intervention, the bare-metal model is configured to implement a static allocation design of data and functional distribution of incoming packets. Thus, due to the static allocation, low processing load remains with several cores with or without load execution, while other cores can reach maximum utilization level. Therefore, there is a performance bottleneck in the 'OS less bare-metal execution' model.

Further, the parallel execution of data decomposition and functional decomposition system as shown in FIG. 5 requires the distribution of the incoming packets to sets of pipelined functionally decomposed processing cores for PDCP, RLC, MAC, FAPI, and packet egress processing. Each such pipelined core is configured to execute per UE basis. Therefore, the incoming packets are initially segregated per UE basis. Thereafter, each incoming packet per UE basis is distributed to multiple cores for handling different pipelined stages. Such data decomposition to route packets of a particular UE to a particular set of processing cores is statically configured. Such static configuration does not allow for the distribution of more than one UE's packets to the same set of pipelined functional decomposed processing cores. In lower data throughput conditions, the opportunity of shutting down a few cores or the opportunity to equally load the available set of cores for All UEs is lost due to static configurations.

Therefore, in order to address the above-mentioned problems, there lies a need to devise a new load balancing method and system for the packet processing and dynamic distribution for both functional stages and dynamic routing of data packets to processing cores.

SUMMARY

According to an example embodiment, the disclosure provides a method for multi-core load scheduling in an operating system (OS) less communication network. The method includes: initializing a plurality of threads, executing on a multi-core processing unit including a plurality of cores, for processing corresponding functionalities associated with one or more incoming packets that are received from a plurality of user equipment (UEs), synchronizing the plurality of initialized threads with each other for simultaneous processing of the one or more incoming packets, determining a Central Processing Unit (CPU) load on each of the plurality of cores and an ingress data-rate of the one or more incoming packets, enabling/disabling a flag for processing the one or more corresponding functionalities associated with the one or more incoming packets, determining at least one thread among the plurality of threads based on the corresponding enabled flags, and processing the one or more corresponding functionalities associated with the one or more incoming packets based on the at least one determined thread.

According to an example embodiment, the disclosure provides a method for multi-core load scheduling in an operating system (OS) less communication network. The method includes: initializing a plurality of threads, executing on a multi-core processing unit including a plurality of cores, for processing one or more user requests from a plurality of user equipment (UEs), synchronizing the plurality of initialized threads with each other for simultaneous processing of the one or more incoming packets, determining a Central Processing Unit (CPU) load on each of the plurality of cores and an occupancy level of a plurality of buffers of the plurality of cores for processing the one or more incoming packets by dynamically distributing the one or more incoming packets to the plurality of buffers or the plurality of threads, enabling or disabling a first flag corresponding to each thread for the corresponding functionalities based on the determined load on each of the cores and enabling or disabling a second flag for distribution of the incoming packets across the buffer based on the determined occupancy level of the plurality of buffers, determining at least one thread among the plurality of threads based on the corresponding enabled first flags, and further, determining at least one buffer among the plurality of buffers based on the enabled second flag, and processing the one or more incoming packets based on each of the at least one determined flag and the at least one determined buffer.

According to an example embodiment, the disclosure provides a system for load scheduling in a communication network. The system includes: a plurality of user equipment (UEs) and a network (NW) entity, such as gNB, configured to receive one or more user requests from the plurality of UEs. The NW Entity includes an operating system (OS) less multi-core processing unit. The OS less multi-core processing unit is configured to initialize a plurality of threads, executing on the multi-core processing unit including a plurality of cores configured to process corresponding functionalities associated with one or more incoming packets that are received from the UEs. The OS less multi-core processing unit is further configured to synchronize the plurality of initialized threads with each other for simultaneous processing of the one or more incoming packets, and thereafter configured to determine a central processing unit (CPU) load on each of the plurality of cores, and an ingress data-rate of the one or more incoming packets. Furthermore, the OS less multi-core processing unit is further configured to enable or disable, based on each of the determined CPU load and the ingress data-rate, a flag corresponding to each thread for processing the one or more corresponding functionalities associated with the one or more incoming packets. The processing unit is further configured to determine at least one thread among the plurality of threads based on the corresponding enabled flags and further configured to process the one or more corresponding functionalities associated with the one or more incoming packets based on the at least one determined thread.

According to an example embodiment, the disclosure provides a system for load scheduling in a communication network. The system includes: a plurality of user equipment (UEs) and a network (NW) entity, such as gNB, for receiving one or more user requests from the plurality of UEs. The NW Entity includes an operating system (OS) less multi-core processing unit. The OS less multi-core processing unit is configured to initialize a plurality of threads, executing on the multi-core processing unit including a plurality of cores, for processing one or more user requests from a plurality of UEs. Further, the processing unit is configured to synchronize the plurality of initialized threads with each other for simultaneous processing of the one or more incoming packets and thereafter configured to determine a central processing unit (CPU) load on each of the plurality of cores, and an occupancy level of a plurality of buffers of the plurality of cores for processing the one or more incoming packets by dynamically distributing the one or more incoming packets to the plurality of buffers or the plurality of threads. Furthermore, the processing unit is configured to enable or disable a first flag corresponding to each thread for the corresponding functionalities based on the determined load on each of the cores, and enable or disable a second flag for distribution of the incoming packets across the buffer based on the determined occupancy level of the plurality of buffers. Thereafter, the processing unit is configured to determine at least one thread among the plurality of threads based on the corresponding enabled first flags and determine at least one buffer among the plurality of buffers based on the enabled second flag. Once the at least one thread and the at least one buffer are determined, wherein the processing unit is configured to process the one or more incoming packets based on each of the at least one determined thread and the at least one determined buffer.

To further clarify the advantages and features of the present disclosure, a more detailed description of the disclosure will be provided with reference to various example embodiments, which are illustrated in the appended drawings. It will be appreciated that these drawings depict only example embodiments and are therefore not to be considered limiting its scope. The disclosure will be described and explained with additional specificity and detail with the accompanying drawings.

BRIEF DESCRIPTION OF THE DRAWINGS

These and other features, aspects, and advantages of certain embodiments of the present disclosure will be more apparent from the following detailed description, taken in conjunction with the accompanying drawings in which like characters represent like parts throughout the drawings, and in which:

FIG. 14 is a flowchart illustrating an example method for real-time multi-core load scheduling in an operating system (OS) less communication network, according to various embodiments.

Figure 1:
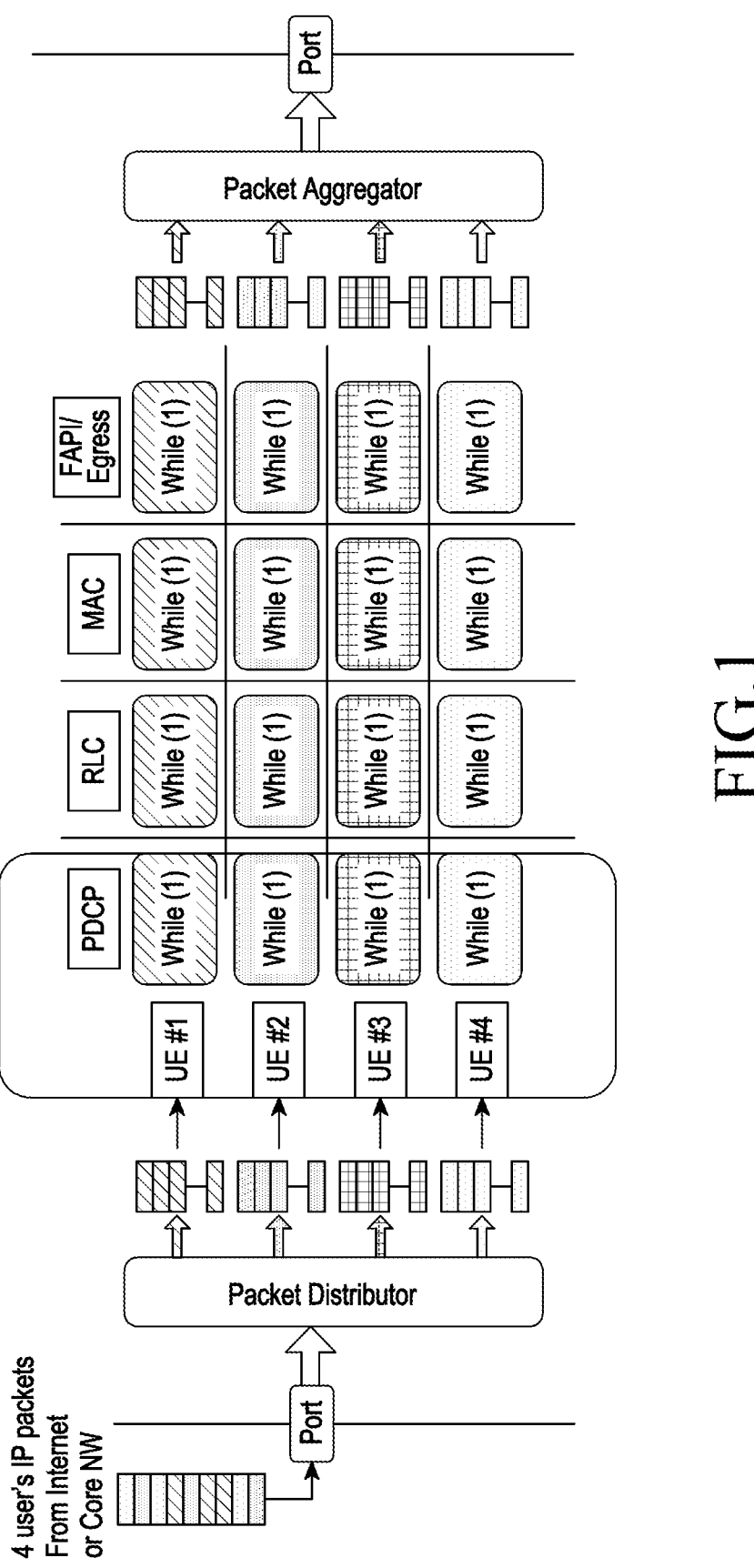
FIG. 1 is a diagram illustrating an example of a parallel processing architecture, according to conventional art.
Figure 2A:
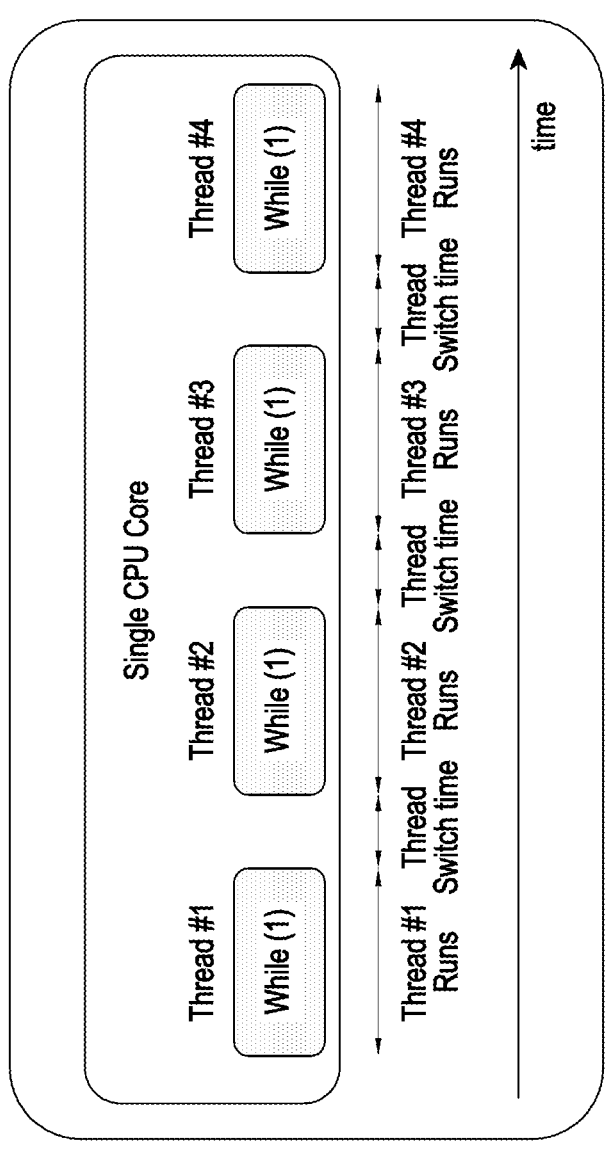
FIG. 2A is a diagram illustrating an example of single core multi-thread processing system, according to conventional art.
Figure 2B:
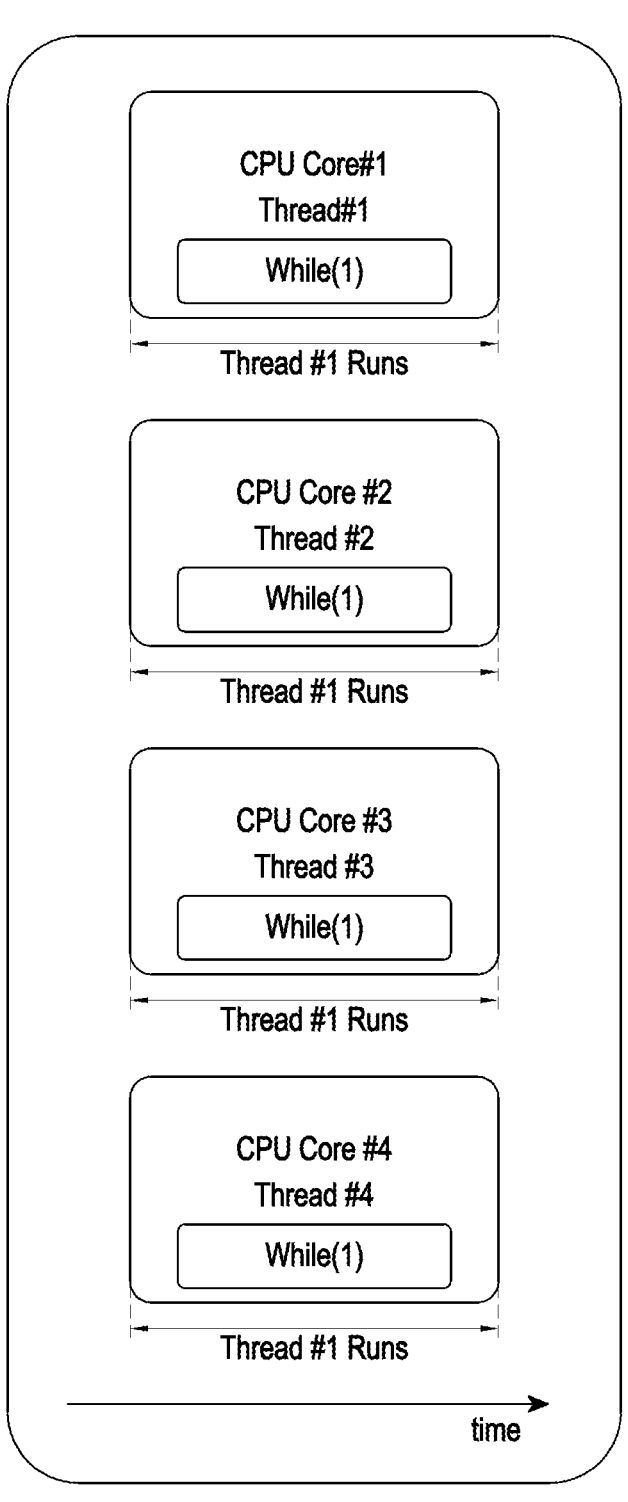
FIG. 2B is a diagram illustrating an example of a multi-core multi-thread processing system, according to conventional art.
Figure 3:
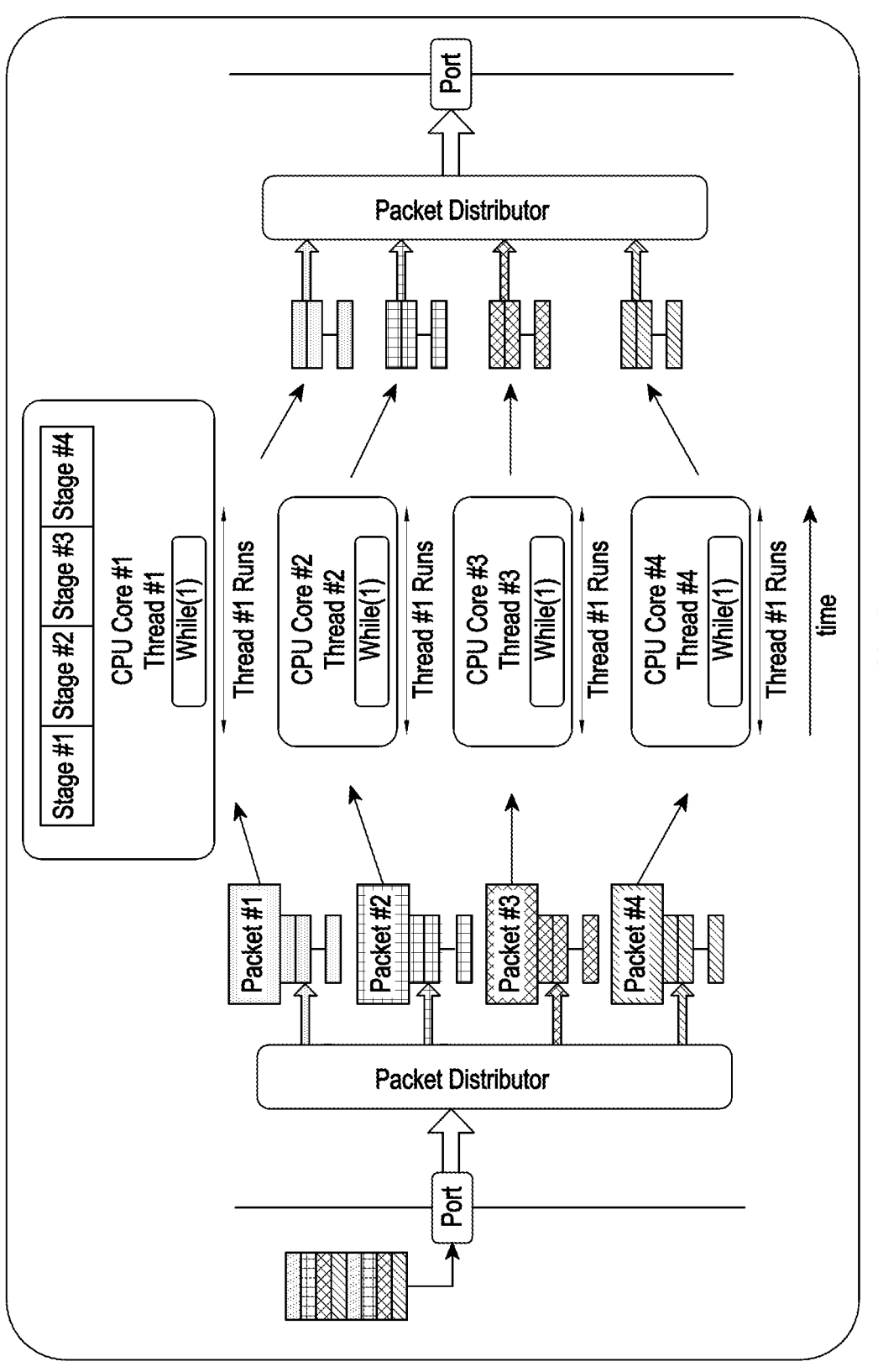
FIG. 3 is a diagram illustrating an example of parallel execution for a data decomposition system, according to conventional art.
Figure 4:
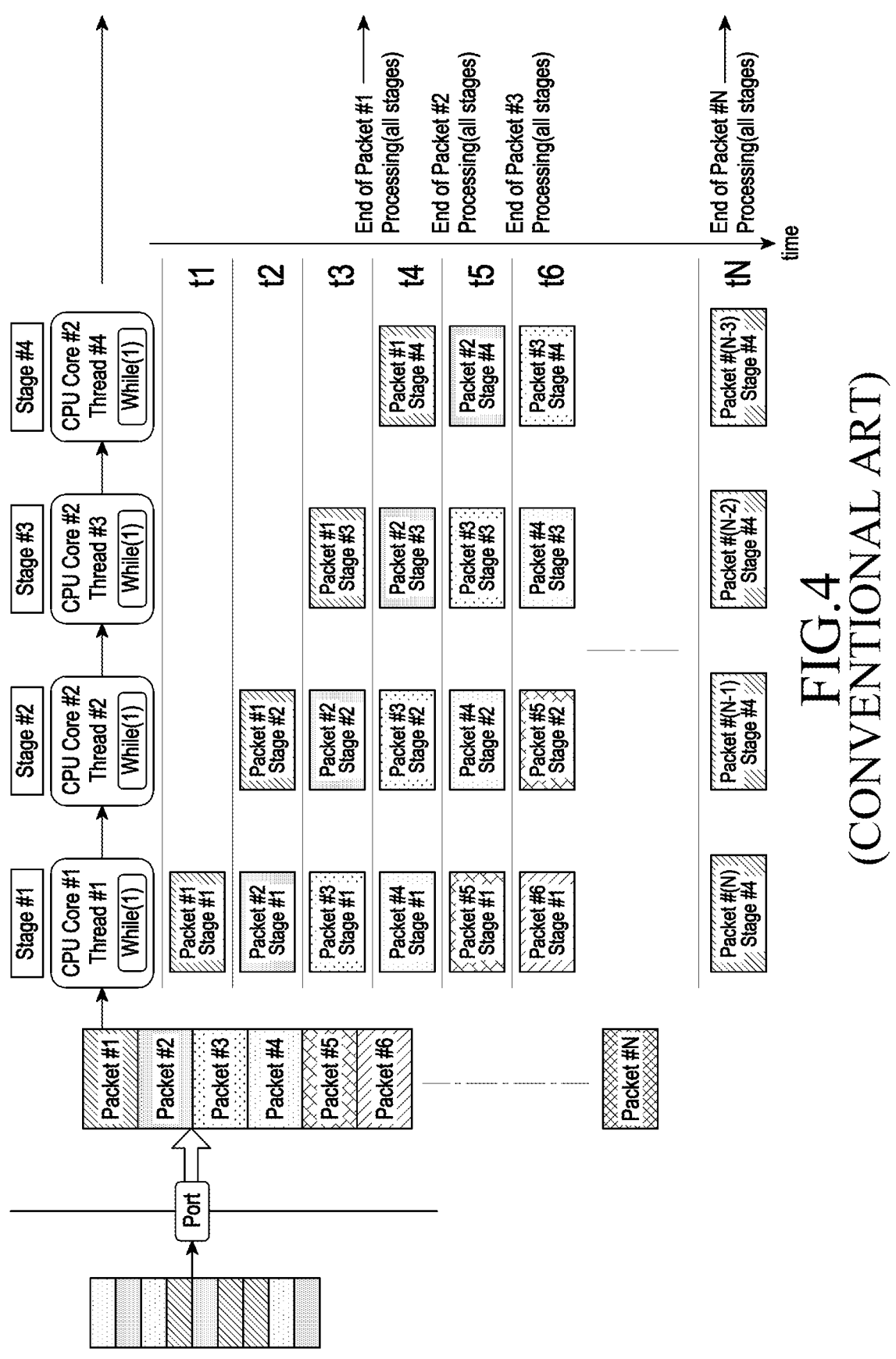
FIG. 4 is a diagram illustrating an example of parallel execution for a functional decomposition system, according to conventional art.
Figure 5:
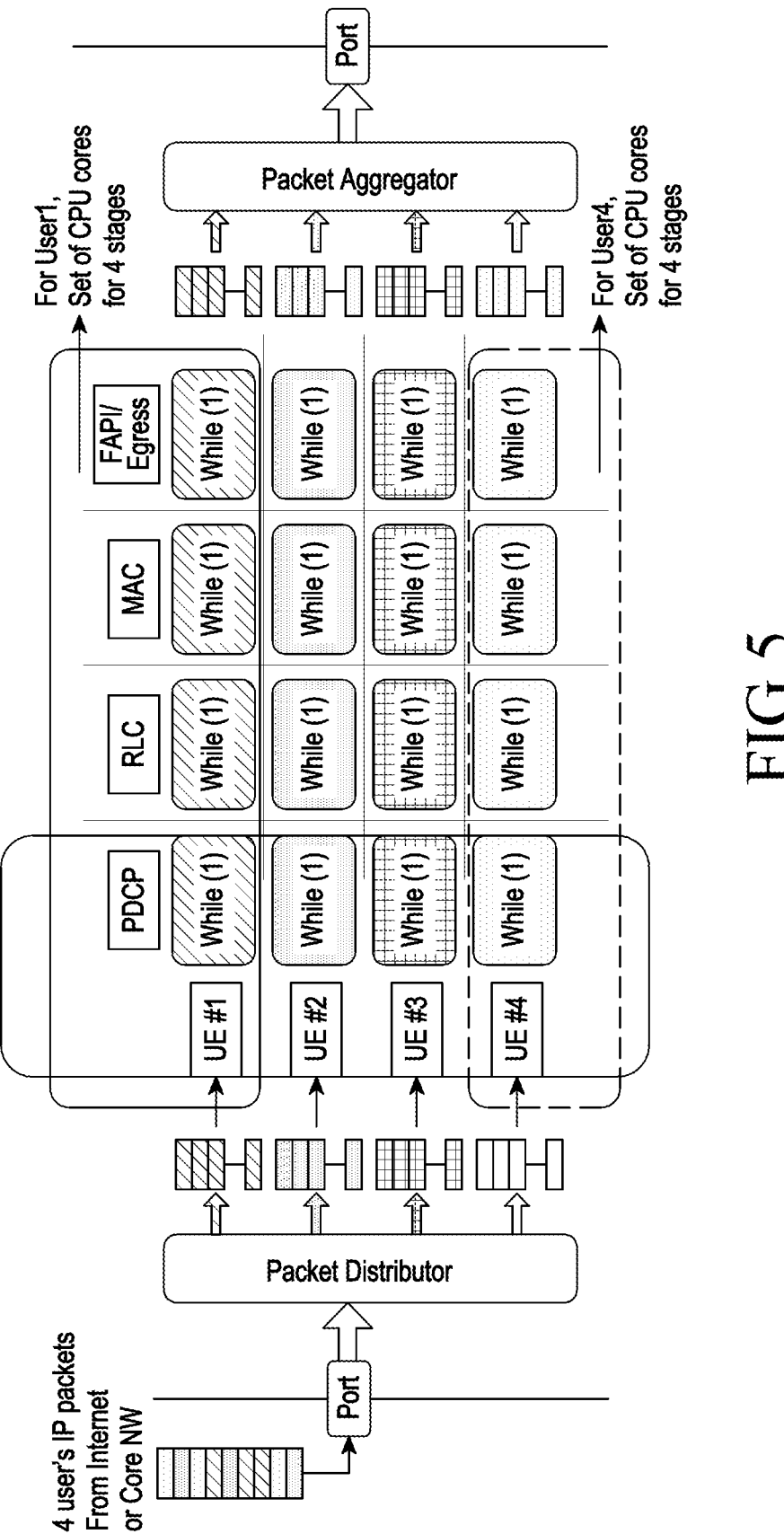
FIG. 5 is a diagram illustrating an example of parallel execution for data decomposition and functional decomposition system, according to conventional art.
Figure 6A:
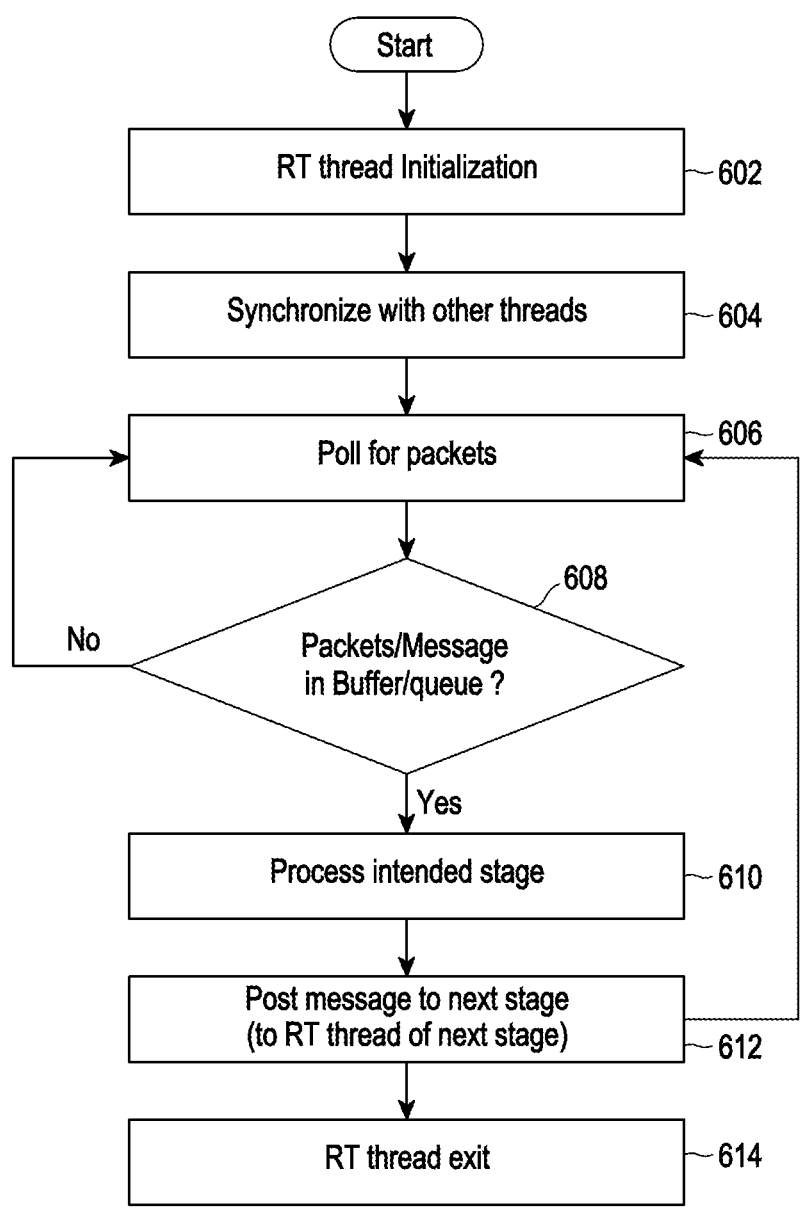
FIG. 6A is a flowchart illustrating thread execution in OS less bare-metal execution, according to conventional art.
Figure 6B:
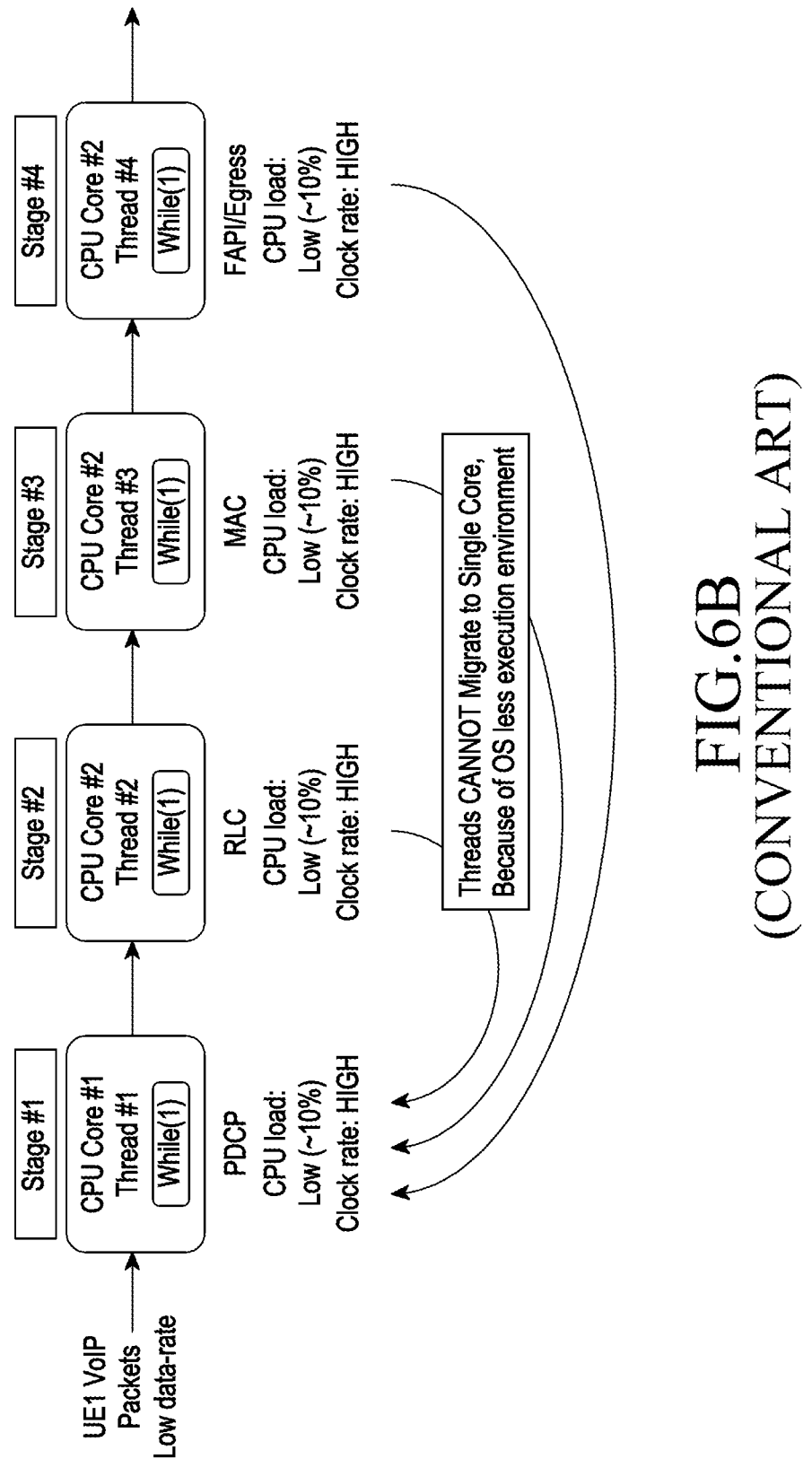
FIG. 6B is a diagram illustrating an example of execution of VoIP (Voice over Internet) calls in 'OS less bare-metal execution', according to conventional art.

Further, skilled artisans will appreciate that elements in the drawings are illustrated for simplicity and may not have necessarily been drawn to scale. For example, the flowcharts illustrate methods in terms of the steps involved to help to improve understanding of aspects of the present disclosure. Furthermore, in terms of the construction of the device, one or more components of the device may have been represented in the drawings by conventional symbols, and the drawings may show various details that are pertinent to understanding the embodiments of the present disclosure so as not to obscure the drawings with details that will be readily apparent to those of ordinary skill in the art having the benefit of the description herein.

DETAILED DESCRIPTION

Reference will now be made to the various example embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would occur to one skilled in the art to which the disclosure relates.

The term "some" or "one or more" as used herein may include "one", "more than one", or all." Accordingly, the terms "more than one," "one or more" or "all" may include "some." or "one or more" The term "an embodiment", "another embodiment", "some embodiments" "in one or more embodiments" may refer to one embodiment or several embodiments or all embodiments. Accordingly, the term "some embodiments" may include "one embodiment, or more than one embodiment, or all embodiments."

The terminology and structure employed herein are for describing, teaching, and illuminating various embodiments and their specific features and elements and do not limit, restrict, or reduce the spirit and scope of the claims or their equivalents. The phrase "exemplary" may refer to an example.

For example, any terms used herein such as but not limited to "includes," "comprises," "has," "consists," "have" and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "must comprise" or "needs to include."

The term "threads" in the claims are referred to as "Real-Time threads" (RT Threads) throughout the disclosure without deviating from the scope of the disclosure.

Whether or not a certain feature or element was limited to being used only once, either way, it may still be referred to as "one or more features", "one or more elements", "at least one feature", or "at least one element." Furthermore, the use of the terms "one or more" or "at least one" feature or element do not preclude there being none of that feature or element unless otherwise specified by limiting language such as "there needs to be one or more" or "one or more element is required."

Unless otherwise defined, all terms, and especially any technical and/or scientific terms, used herein may be taken to have the same meaning as commonly understood by one having ordinary skill in the art.

Embodiments of the present disclosed will be described in greater detail below with reference to the accompanying drawings.

Figure 7A:
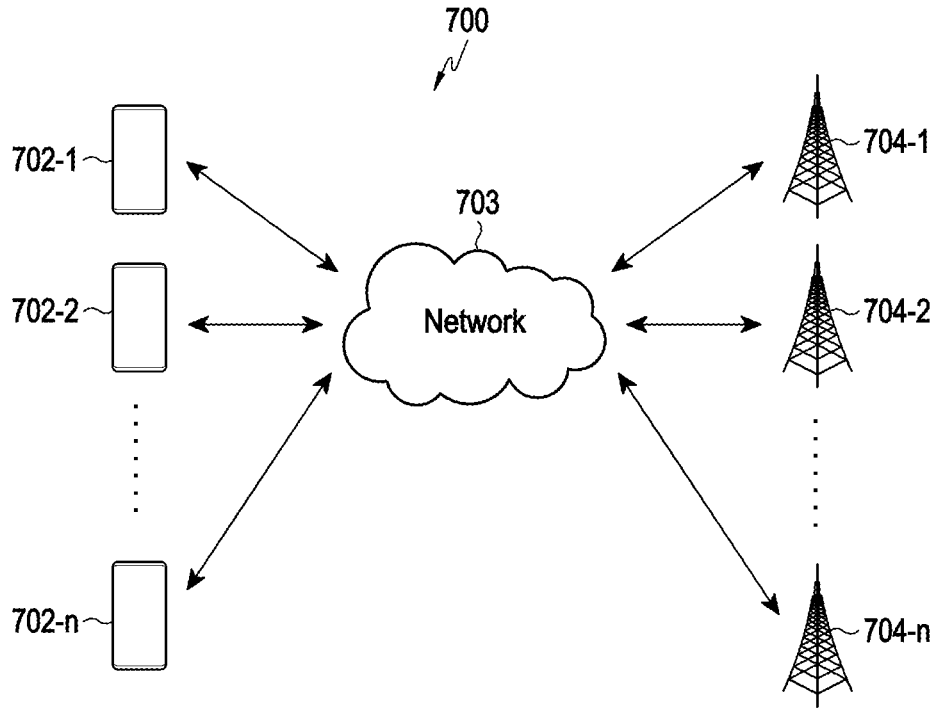
FIG. 7A is a diagram illustrating an example system for real-time load scheduling in a communication network, according to various embodiments.

FIG. 7A is a diagram illustrating an example system for real-time load scheduling in a communication network, according to various embodiments. The system 700 as shown in FIG. 7A includes a network 703 for establishing communication between a plurality of user equipment, UEs, 702.1 to 702.*n*, and a plurality of network (NW) entity, for example, gNBs, 704.1 to 704.*n*. Each of the plurality of UEs 702 may communicate with any of the gNBs 704 via the network 703, and vice versa. The UE and the gNB are further illustrated in FIGS. 7B and 7C. Further, the system may be adapted to perform various methods illustrated in various flowcharts of FIGS. 8, 9, 10A and 10B, 11A and 11B, and 13.

Figure 7B:
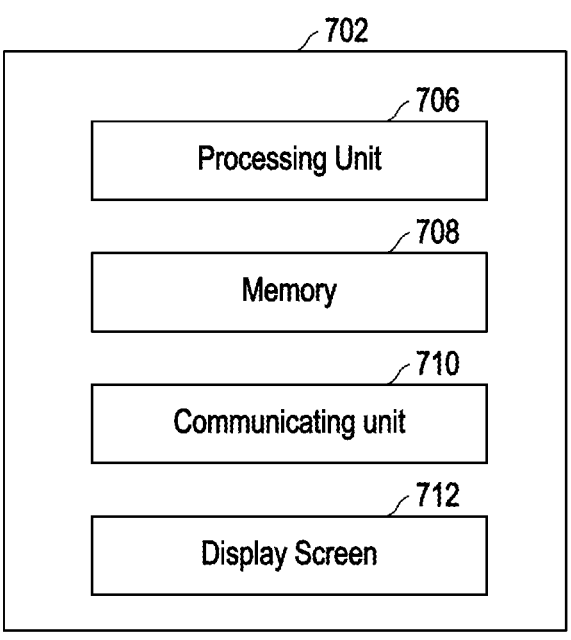
FIG. 7B is a block diagram illustrating an example configuration of User Equipment, according to various embodiments.

As shown in FIG. 7B, the UE 702 may include at least one processing unit (e.g., including processing circuitry) 706, a memory 708, a communication unit (e.g., including communication circuitry) 710, and a display unit (e.g., including a display) 712, in accordance with various embodiments. The processing unit 706 is electrically connected with the communication unit 710 for controlling transmitting and receiving signals from the gNBs 704. The memory 708 includes one or more computer-readable storage media. The memory 708 may include non-volatile memory. The display unit 712 is configured to display a graphical user interface (GUI) for receiving user inputs under the control of the processing unit 706. Such user inputs act as user requests and may correspond to a request for accessing a plurality of contents from any server via the gNBs 704. Therefore, upon receiving such a request from the user via a GUI displayed on the display unit 712, the UE 702 transmits the request to the gNBs 704 via the network 703. Upon processing the request in the server, the UE 702 receives the corresponding response from the gNBs to complete the user request.

Figure 7C:
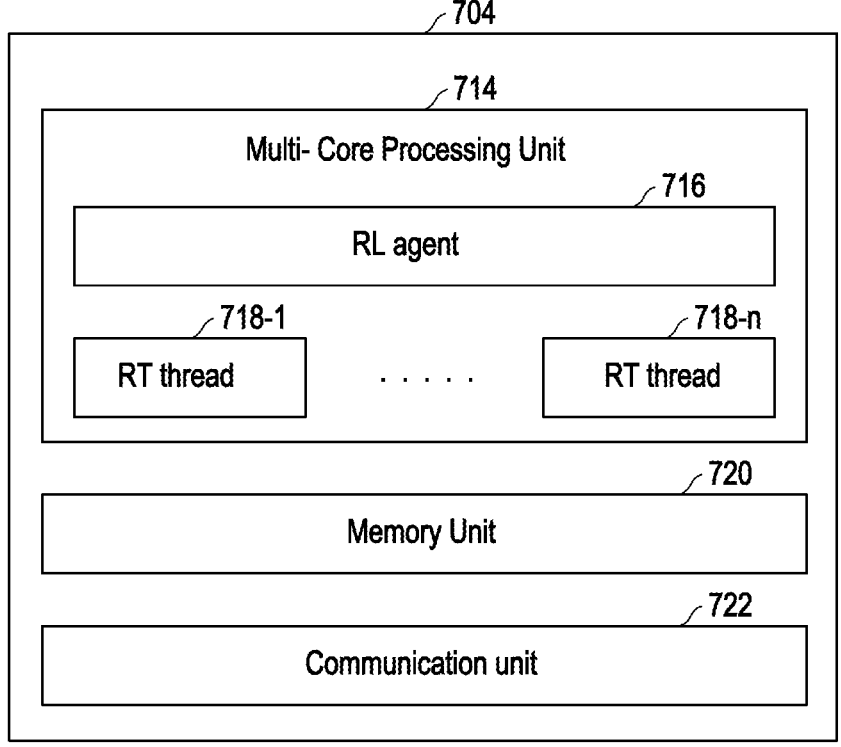
FIG. 7C is a block diagram illustrating an example configuration of gNBs, according to various embodiments.

As shown in FIG. 7C, the gNBs 704 includes a multi-core processing unit (e.g., including processing circuitry) 714, a memory unit (e.g., including a memory) 720, and a communication unit (e.g., including communication circuitry) 722, according to various embodiments. The multi-core processing unit 714 further includes at least one reinforcement learning (RL) agent 716, and real-time threads (RT threads) 718.1 to 718.*n* (hereinafter, either each of the RT threads or in combination, referred to as 718), each or which may include various processing circuitry and/or executable program instructions.

The multi-core processing unit 714 includes several core-units, all of which are configured to process the multiple user requests parallelly. The multi-core processing unit 714 may be implemented as a plurality of microprocessors, micro-computers, microcontrollers, digital signal processors, central processing units, state machines, logic circuitries, and/or any devices that manipulate signals based on operational instructions. Among other capabilities, the multi-core processing unit 714 is configured to fetch and execute computer-readable instructions and data stored in memory unit 720.

The memory unit 720 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The communication unit 722 may include various communication circuitry and is configured to communicate voice, video, audio, images, or any other data over the network 703. Further, the communication unit 722 may include a communication port or a communication interface for sending and receiving notifications from the UEs 702 via the network 703. The communication port or the communication interface may be a part of the multi-core processing unit 714 or maybe a separate component. The communication port may be created in software or maybe a physical connection in hardware. The communication port may be configured to connect with the network 703, external media, or any other components, or combinations thereof. The connection with the network 703 may be a physical connection, such as a wired Ethernet connection or may be established wirelessly as discussed above.

The RL agent 716 is being executed continuously as a thread by at least one dedicated core of the multi-core processing unit 714. The RL agent 716 is corresponding to a pre-trained prediction unit, which may be a machine learning model. The RL agent uses a reinforcement learning based method to schedule load in the multi-core processing unit without any intervention of the OS. In other words, the RL agent 716 is configured to schedule load in multi-core processing unit in real-time based on the status of buffer or load on each core of the multi-core processing unit without any interruption or intervention from OS.

The RL agent 716 may be a closed loop learning method. The RL agent 716 recognizes an action on which a decision has been made based in the past, so it takes a recommendation for a similar action. Therefore, the RL agent 716 receives feedback from the past action, and subsequently, takes further action based on the last feedback. The closed loop learning method includes defining a policy based on a plurality of options related to an action available in a given state of a system under learning. Further, the closed loop learning method includes performing the action based on the defined policy. Furthermore, the closed-loop learning method comprises fine-tuning the performed action based on one or more rewards received based on the performed action. Subsequently, the closed loop learning method includes generating a table based on the performed action and the plurality of received rewards in different states of the system under learning.

The plurality of options includes a definition related to learning with respect to the action performed in real-time. Further, the fine-tuning of the table based on the performed action and the rewards are performed until a reception of an optimized reward. The results of rewards vs actions are recorded continuously in a table (Q-table), against the different states of the system under learning. This process of learning continuously and arriving at the matured Q-table is called, Q-learning. The definition of the plurality of options includes how greedily the "Q-learning" explores the available options of the different actions available for any given state of the system. As a non-limiting example, there may be a more-greedy approach and a less-greedy approach. The more-greedy approach attempts to explore all available options for the action. On the other hand, the less-greedy approach only utilizes the action which is already provided good results in the past. The fine-tuning is performed until a reception of an optimized reward. A non-limiting example of the "Q-table" is shown below in Table 1.

TABLE 1

|  | Action#1 | Action#2 | Action#3 |
|---|---|---|---|
| State#1 | 0.9 | −0.9 | −0.9 |
| State#2 | 1 | 0.7 | −0.7 |
| State#3 | 0.9 | 1 | 0.9 |
| State#4 | −0.9 | −0.9 | −0.9 |

The "Q-table" as shown in Table 1 records the rewards for an action against the state. In this example, 1 is considered the best reward, and −1 is considered as the penalty. As an example, for a given State #1, Action #1 gives the best rewards as the rewards are close to 1. Therefore, for the next iteration, in the less-greedy approach, Action #1 is performed when the system is in State #1.

The RT threads 718 are configured to run on a plurality of cores of a multi-core processing unit. The RT threads 718 are configured to process the incoming packets of the UEs 702. In a non-limiting example, the RT threads 718 may be configured to process all functionalities or stages of the incoming packets from any specific UE 702. Further, the RT threads 718 may be configured to process one or more functional components or one or more stages of all the incoming packets. Further, the RT threads 718 may also be configured to process a specific functional component or a stage of incoming packets corresponding to a specific UE among all the UEs 702.

Figure 8:
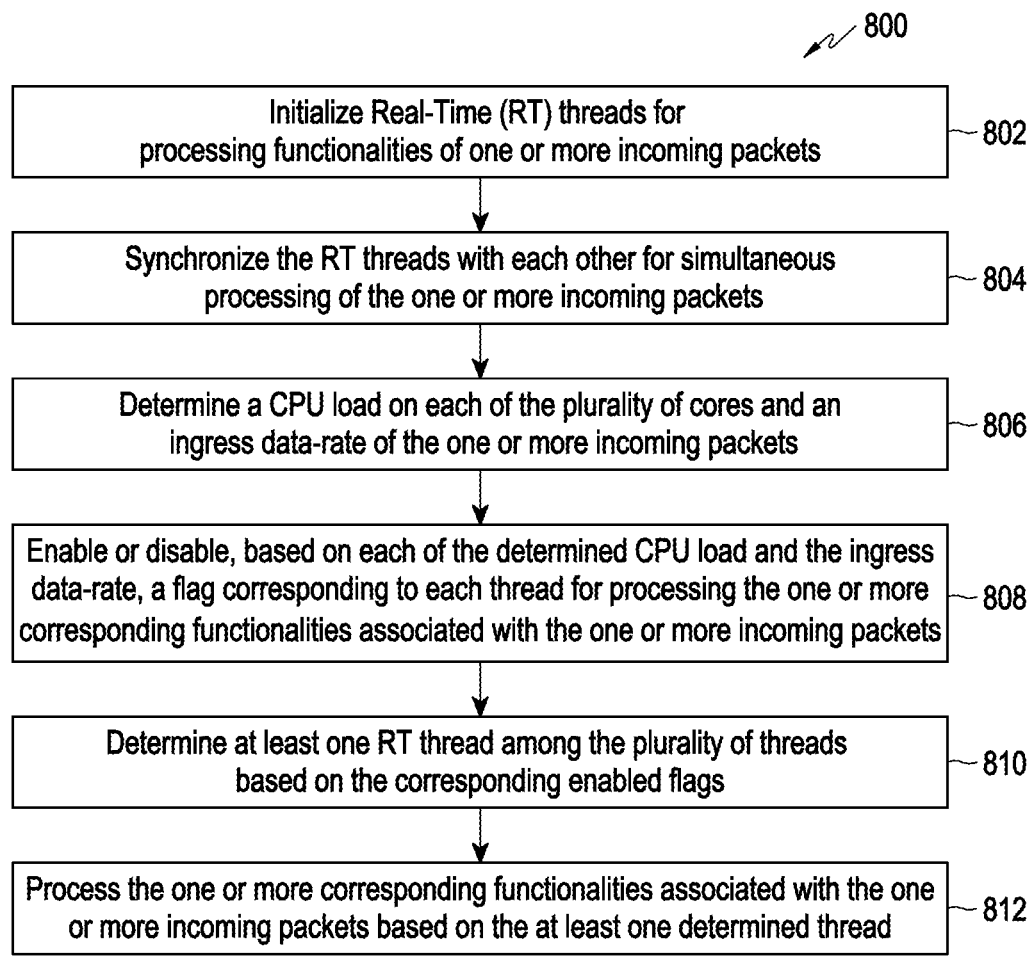
FIG. 8 is a flowchart illustrating an example method for real-time multi-core load scheduling in an operating system (OS) less communication network, according to various embodiments.

A flowchart illustrating an example method is described with reference to FIG. 8. FIG. 8 is a flowchart illustrating an example method for real-time multi-core load scheduling in an operating system (OS) less communication network, according to various embodiments. The method of FIG. 8 relates to dynamically load scheduling in case of the 'functional decomposition' of the incoming packets.

The method 800 comprises initializing (at 802), RT threads 718 for processing corresponding functionalities associated with one or more incoming packets that are received from a plurality of UEs 702. As an example, the method initializes the RT threads for receiving the one or more incoming packets from the plurality of UEs 702 via the network 703. Further, the multi-core processing unit 714 of the gNBs of the communication network initializes the RT threads 718 at the time of starting or boot-up.

At 804, the method 800 further comprises synchronizing the initialized RT threads with each other for simultaneous processing of the one or more incoming packets. In an embodiment, the synchronization process is required to configure the RT threads to recognize the stages or functionalities of any incoming packets to be processed by each of the RT threads. In a non-limiting example, the RT threads may be synchronized such that each of the RT threads are responsible for processing the incoming packets from the first UE as well as the second UE at the PDCP stages and the RLC stages.

At 806, the method 800 further includes determining a CPU load on each of the plurality of cores of the multi-core processing unit, and an ingress data-rate of the one or more incoming packets. In an example, the multi-core processing unit 714 is configured to run the RL agent 716 in at least one core of the multi-core processing unit. The RL agent 716 determines the load on each of the cores of the multiprocessing unit. The load on each of the cores is the number of processes being executed by the core or waiting to be executed by the core. Thus, the core load average is the average number of processes being executed or waiting to be executed over past few minutes on the core. Therefore, a high core load average denotes load on the core is high. Further, the RL agent 716 determines the ingress data-rate of one or more incoming packets from the plurality of UEs 702. The ingress data-rate relates to one or more incoming data packets in a buffer of each of the cores of the multi-core processing unit 714. Therefore, the rate of incoming packets from the plurality of UEs into the buffer of each of the cores is known as the ingress data-rate.

The method further includes determining (806) each of core load conditions, a throughput, a thermal efficiency, and a power optimization level of the multi-core processing unit. Based on the determined load condition, the throughput, the thermal efficiency, and the power optimization level, the method further includes determining at least one RT thread for processing the incoming packets from the plurality of UEs 702.

At 808, the method 800 further includes enabling or disabling, based on each of the determined loads and the ingress data-rate, a flag corresponding to each thread for processing the one or more corresponding functionalities associated with the one or more incoming packets. For example, the RL agent 716 enables or disables at least one flag based on the determined CPU load and the ingress data-rate. Such enabled flag or disabled flag ensures that the corresponding core is in active status or non-active for processing the incoming packets. In a non-limiting example, the multi-core processing unit may include sixteen (16) cores for processing incoming packets from UE #1 to UE #4, As a non-limiting example, Table 2 (mentioned below) discloses that the corresponding core may be responsible for processing a particular stage or functionality of any UE. The RT thread of the core_1 may be configured to process the incoming packets at the PDCP stage of the UE #1. Similarly, the RT thread of the core_7 may be configured to process the incoming packets at the RLC stage of UE #2.

TABLE 2

|      | PDCP    | MAC      | RLC      | FAPI     |
|------|---------|----------|----------|----------|
| UE#1 | CORE_1  | CORE_2   | CORE_3   | CORE_4   |
| UE#2 | CORE_5  | CORE_6   | CORE_7   | CORE_8   |
| UE#3 | CORE_9  | CORE_10  | CORE_11  | CORE_12  |
| UE#4 | CORE_13 | CORE_14  | CORE_15  | CORE_16  |

In accordance with an embodiment, the method may enable or disable at least one of the following flags for processing the incoming packets based on the load on the core and the ingress data-rate. The flags may be represented as:

PDCP_PROCESSING_CORE_X
MAC_PROCESSING_CORE_X
RLC_PROCESSING_CORE_X
FAPI_PROCESSING_CORE_X
Note: X represents CPU Core #
X: 1 to 4 are the pipelined CPU-cores for UE #1
X: 5 to 8 are the pipelined CPU-cores for UE #2
X: 9 to 11 are the pipelined CPU-cores for UE #3
X: 12 to 16 are the pipelined CPU-cores for UE #4

Therefore, based on the determined load and the ingress data-rate of the core, the RL agent 716 enables the particular flag to enable the specific RT thread 718 of that core to process the incoming packet stages. As an example, if the PDCP_PROCESSING_CORE_1 flag is enabled, then the RT thread of core_1 processes the incoming packets from UE #1 at the PDCP stage. Further, if MAC_PROCESSING_CORE_1 flag is enabled, then the RT thread of core_1 processes the incoming packets from UE #1 at the MAC stage. Similarly, if MAC_PROCESSING_CORE_7 flag is enabled, then the RT thread of core_7 processes the incoming packets from UE #2 at the MAC stage. Therefore, in a normal scenario (as shown in the example illustration in Table 2), the following flags are enabled for UE #1:

PDCP_PROCESSING_CORE_1
MAC_PROCESSING_CORE_2
RLC_PROCESSING_CORE_3
FAPI_PROCESSING_CORE_4

In a normal scenario, if the RL agent 716 determines that the ingress data-rate is high for UE #1. Further, the load on core_2 is high for processing packets for MAC stages, but the load on core_1 is low for processing the PDCP stages. The RL agent 716 may dynamically enable the flag MAC_PROCESSING_CORE_1 along with PDCP_PRO-CESSING_CORE_1. Thus, the RL thread relating to core_1 is enabled to process PDCP and MAC stages of incoming packets from UE #1. Therefore, the RL Agent 716 dynamically decides which stage of the pipeline to execute on a given RT thread/core. Thus, the RT threads are migrated/scheduled across the cores, via an RL Agent, without causing any overhead, unlike OS-based scheduling. Therefore, the RL agent 716 dynamically decides the best settings of 'which part of proposed RT thread' should run in which core for minimum power consumption and maximum packet processing performance.

In various embodiments, the method further comprises disabling the enabled flag. To disable the flag, the method includes determining a throughput of the multi-core processing unit based on a type of the one or more incoming packets. In a case when it is determined that the throughput of the multi-core processing unit is greater than a pre-defined threshold value, the method includes disabling the enabled flag for reducing a load on the plurality of cores, and power consumed by the plurality of cores. Therefore, based on the determined throughput of the core, the method disables the enabled flag for a core. Once the flag is disabled, the corresponding stages or packets are not being processed by the core.

At 810, the method 800 further comprises determining at least one thread among the plurality of threads based on the corresponding enabled flags. In particular, the method includes determining the RT thread based on the corresponding enabled flags to process the corresponding stages of the incoming packets.

At 812, the method 800 further comprises processing the one or more corresponding functionalities associated with the one or more incoming packets based on the at least one determined RT thread.

In various embodiments, the enabling of the at least one flag (in 808) for processing the one or more corresponding functionalities associated with the incoming packets is defined as the action performed by the pre-trained prediction unit. Further, the ingress data-rate determined by the pre-trained prediction unit is defined as the state of a system under learning. Furthermore, the determination of the load on each of the cores of the multi-core processing unit is defined as the one or more rewards received by the pre-trained prediction unit. Therefore, the RL agent may monitor the ingress data-rate as a state of the system under learning. Based on the given state, the RL agent may perform the action of enabling or disabling the at least one flag based on a policy defined for the given state of the system. Further, the RL agent may receive a reward as a load on the core based on the action taken by the RL agent. In various embodiments, the RL agent may perform the action of disabling the at least one enabled flag based on the given state of the system.

Figure 9:
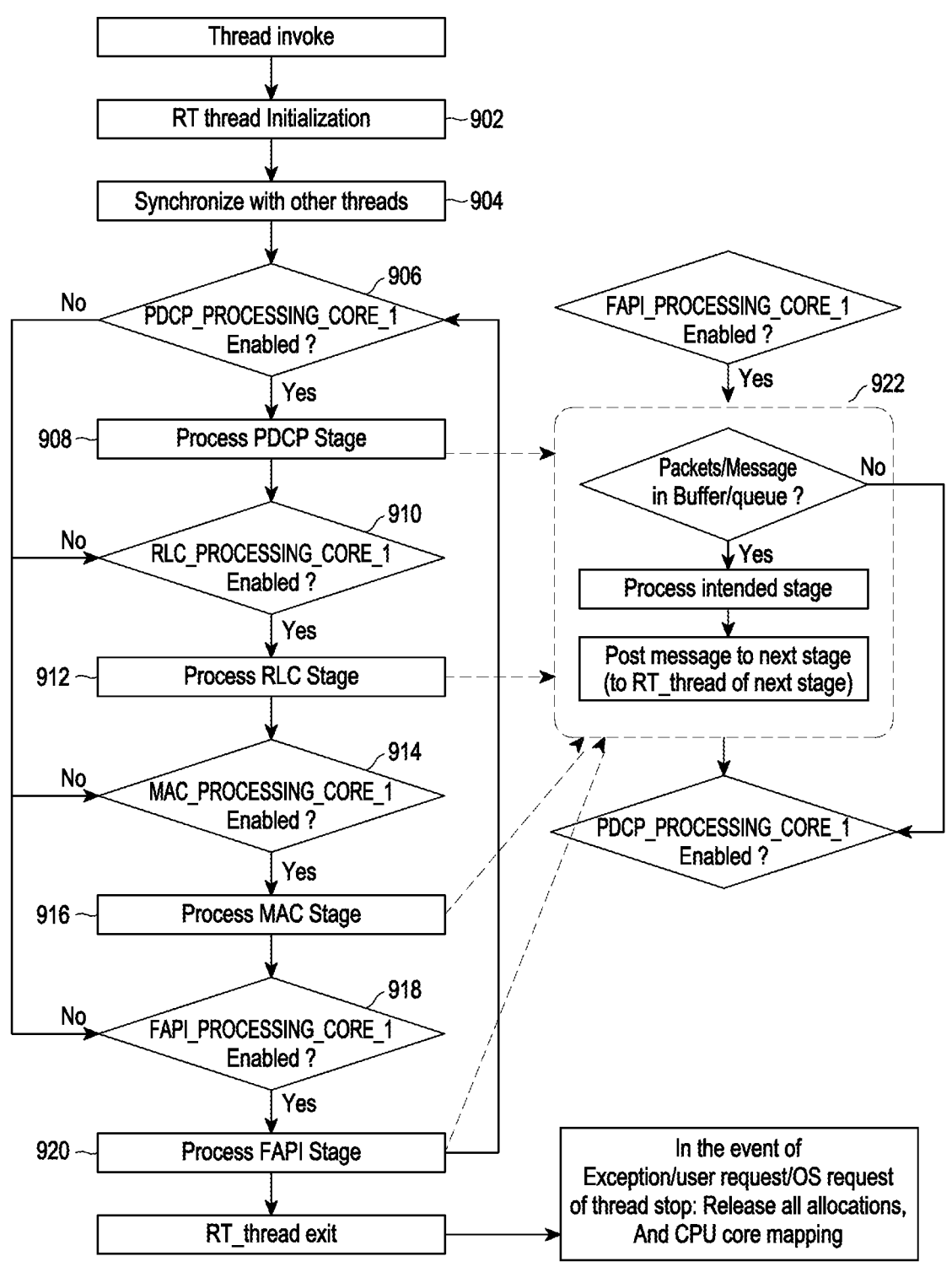
FIG. 9 is a flowchart illustrating an example method for processing packet stages based on at least one enabled flag in a RT thread, according to various embodiments.

FIG. 9 is a flowchart illustrating an example method for processing packet stages based on at least one enabled flag in an RT thread, according to various embodiments. FIG. 9 discloses assessment in the RT thread in core_1 in the multi-core processing unit.

In 902, the method initializes the RT threads in core_1. Further, in 904, the RT threads in core_1 synchronize with the RT threads initialized in other cores of the multi-core processing unit. Further, the threads initiate a polling process for determining packets to process particular functionalities or stages for which the at least one flag is enabled. The polling process runs constantly in a continuous loop for receiving packets of the particular stage as disclosed in 606. Based on the polling process, in 906, the RT threads of core_1 process any of the incoming packets from UE #1 at the PDCP stage (at 908), if the PDCP_PROCESSING_CORE_1 flag is enabled. Similarly, in 910, the RT threads of core_1 process any of the incoming packets from UE #1 at the RLC stage (at 912), if the RLC_PROCESSING_CORE_1 flag is enabled. Similarly, in 914 and 918, the RT threads process the incoming packets from UE #1 at the MAC and FAPI stages (at 916 and 920) if the corresponding flags are enabled. In 922, the operations of processing each incoming packet stage are illustrated. Once the corresponding flag is enabled, the packets are moved into a buffer or queue of corresponding cores. Further, any incoming message of completion of the prior stage may also be moved into the buffer or queue of corresponding cores. Once the packets or messages are available in the buffer or queue, the RT thread of the corresponding core processes the incoming packets at the intended stages. Upon completion of processing of the intended stages, the RT thread broadcasts a message of completion of the intended stages. If the packets are unavailable in the buffer or queue, the polling process continues to loop to determine the required packet stages.

Figure 10A:
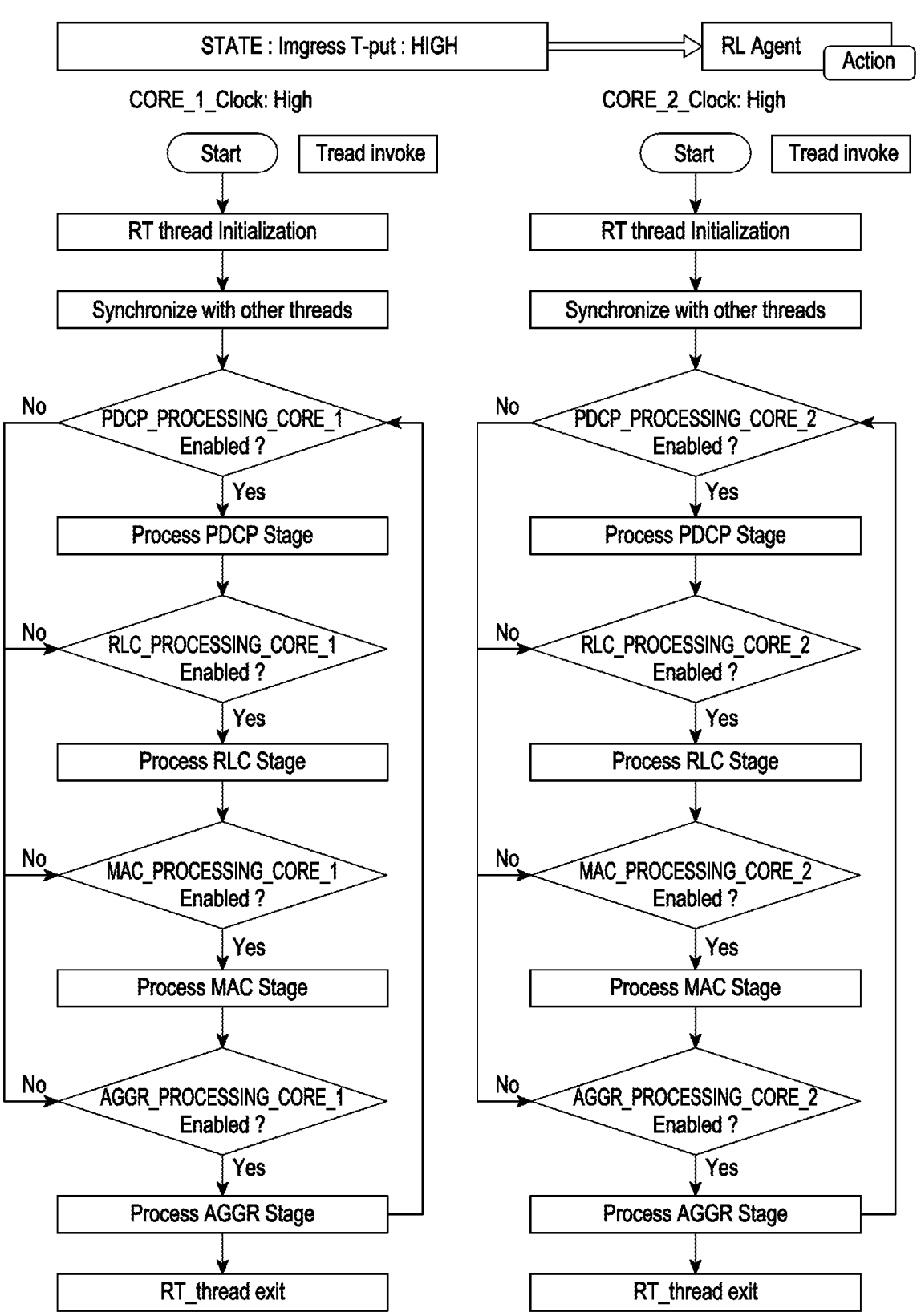
FIGS. 10A and 10B include a plurality of flowcharts illustrating example methods for processing packet stages in a plurality of cores, according to various embodiments.
Figure 10B:
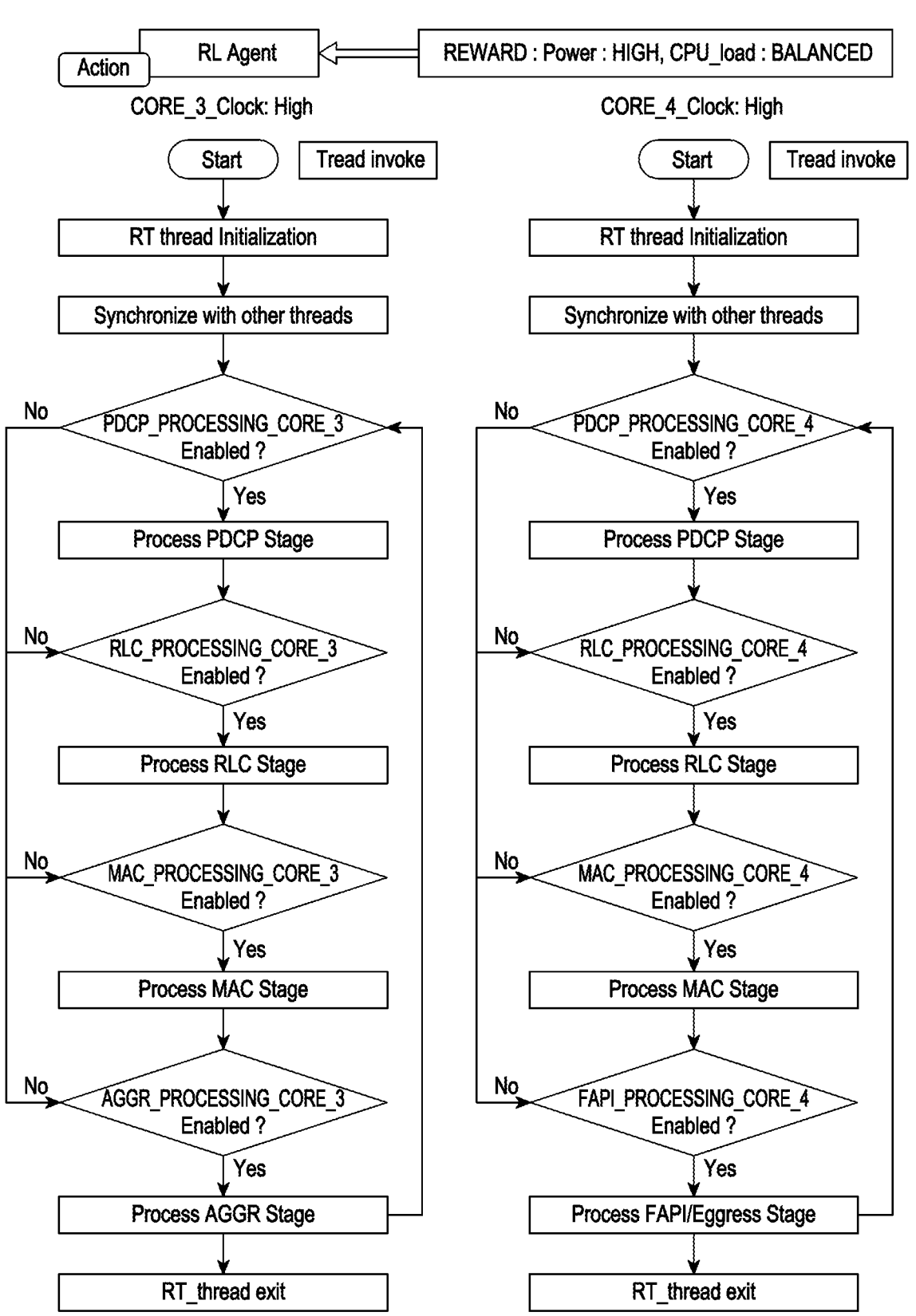

FIGS. 10A and 10B include a plurality of flowcharts illustrating example methods for processing packet stages in a plurality of cores, according to various embodiments. In FIGS. 10A and 10B, the pipeline execution scenarios are disclosed in the plurality of RT threads of the cores via the RL agent. In this example embodiment, the state of the system under learning is taken as high ingress data-rate. However, the incoming packets require high processing in each of the stages. Thus, the RL agent performs the action to enable flag for each stage in different cores. Therefore, in core_1, the flag PDCP_PROCESSING_CORE_1 is enabled, but all other flags (such as, RLC_PROCESSING_CORE_1, MAC_PROCESSING_CORE_1, and FAPI_PROCESS-ING_CORE_1) are disabled. Similarly, in core_2, the RLC_PROCESSING_CORE_2 flag is enabled, but all other flags (PDCP_PROCESSING_CORE_2, MAC_PROCESS-ING_CORE_2, FAPI_PROCESSING_CORE_2) are disabled. Similarly, in core_3, the MAC_PROCESSING_ CORE_3 flag is enabled, but all other flags (PDCP_PRO-CESSING_CORE_3, RLC_PROCESSING_ CORE_3, and FAPI_PROCESSING_CORE_3) are disabled. Similar to that, in core 4, the FAPI_PROCESSING_ CORE_4 is enabled, and all other flags are disabled. Thus, RT threads of core_1 process PDCP stages of the incoming packets as the corresponding PDCP flag is enabled. Likewise, RT threads of the core_2 process the RLC stages of the incoming packets as the corresponding RLC flag is enabled. Although the ingress data-rate is high, the load on each CPU core is balanced as each core is responsible for processing each stage of the incoming packets. As all cores are in active status for processing corresponding functionalities/stages of the incoming packets, therefore, the clock rate of each core is high. The example embodiment is applicable for 4K YouTube streaming and downloading of the file, which requires high processing of each stage of the packets. The distribution of execution of stages in different RT threads provides max throughput, but there is no power saving.

Figure 11A:
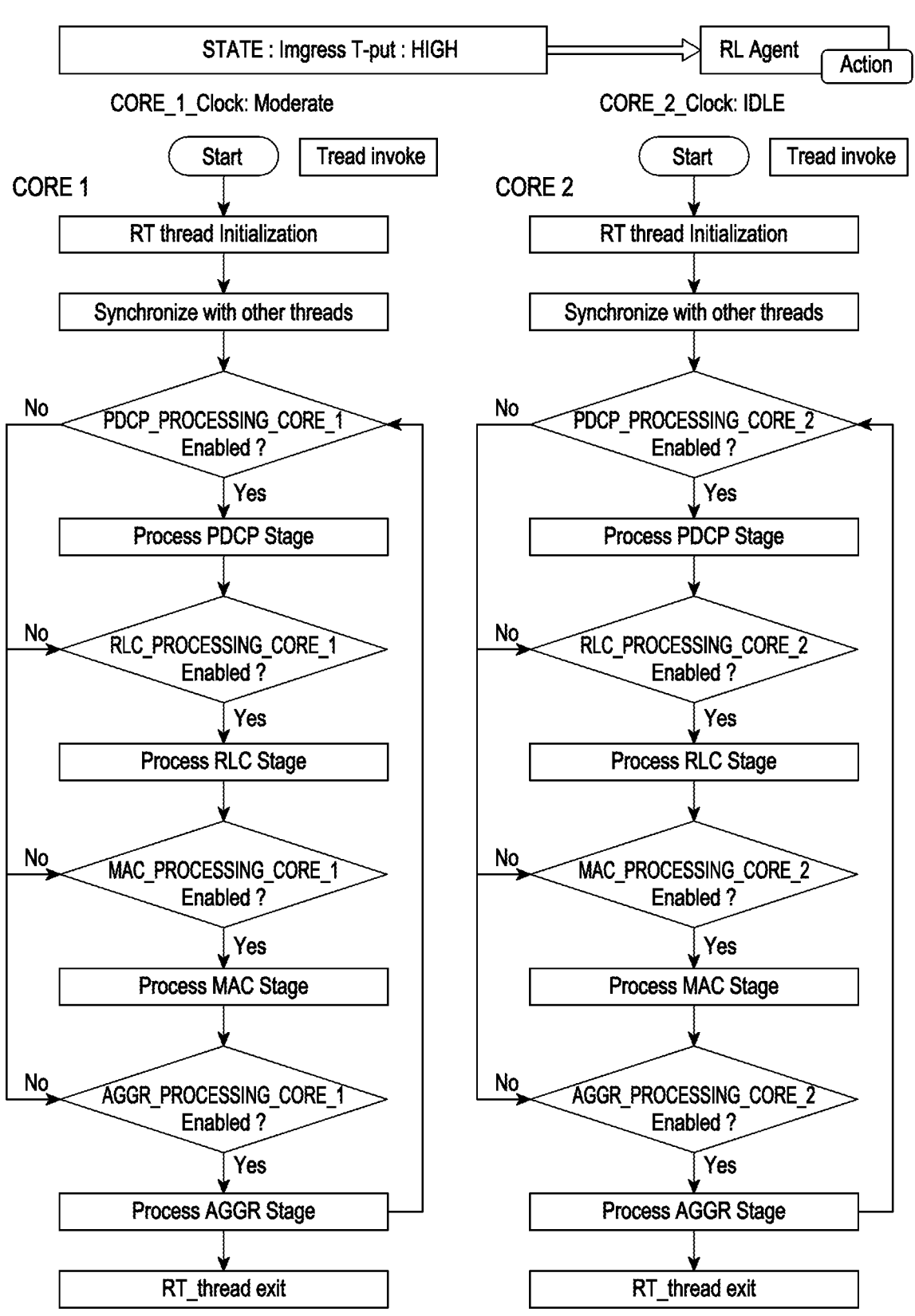
FIGS. 11A and 11B include a plurality of flowcharts illustrating example methods for processing packet stages in a single core of multi-core processing unit, according to various embodiments.
Figure 11B:
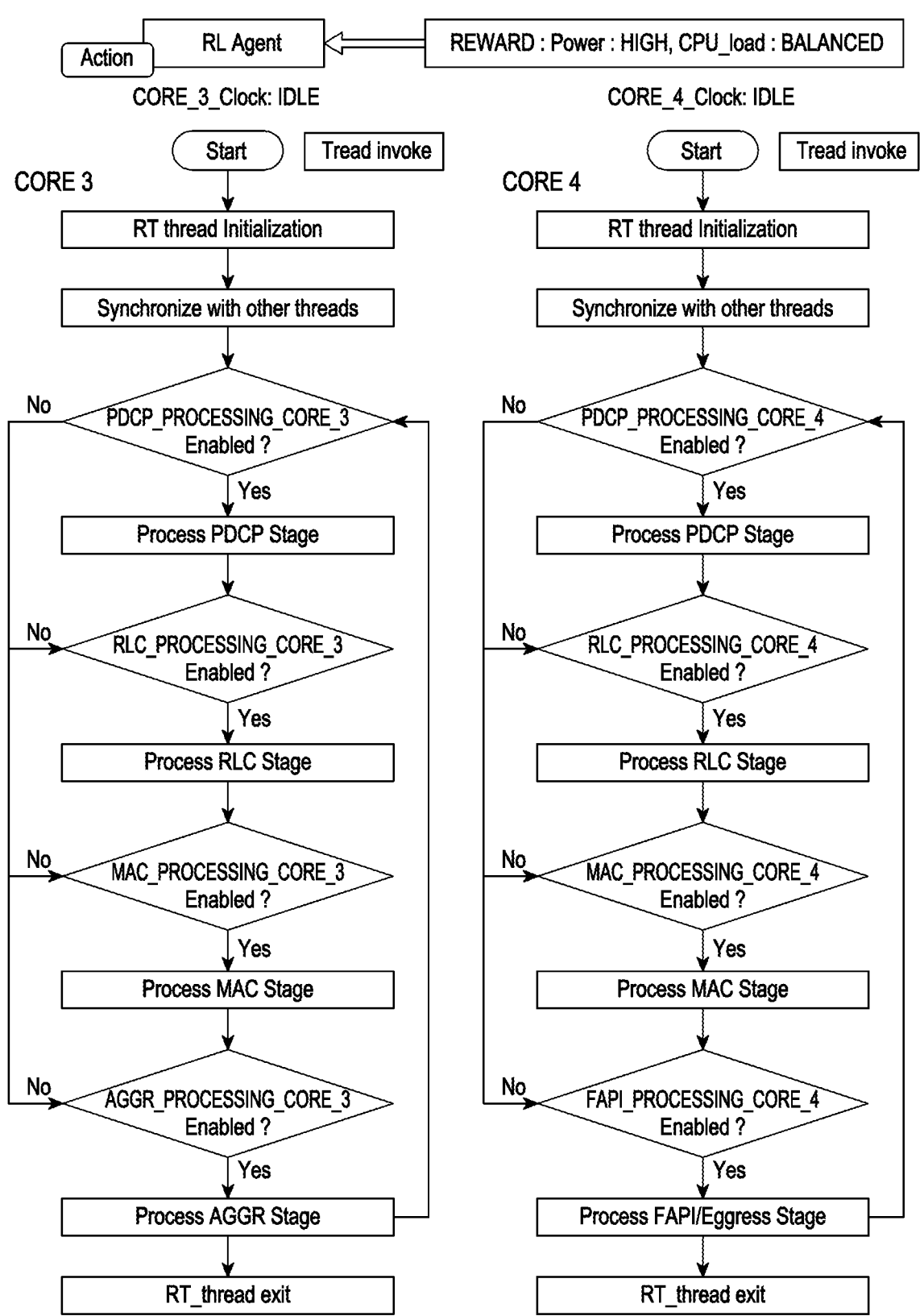

FIGS. 11A and 11B include a plurality of flowcharts illustrating example methods for processing packet stages in a single core of the multi-core processing unit, according to various embodiments. In an embodiment, the state of the system under learning is taken as ingress data-rate as low. However, the incoming packets require low processing in each of the stages. Thus, the RL agent performs the action to enable flag for each stage in a single core/RT thread. Therefore, in core_1, the flags PDCP_PROCESSING_ CORE_1, RLC_PROCESSING_CORE_1, MAC_PRO-CESSING_CORE_1, FAPI_PROCESSING_CORE_1 are enabled. But all flags in all other cores are disabled. In core_2, all flags corresponding to core_2, such as, PDCP_ PROCESSING_CORE_2, RLC_PROCESSING_ CORE_2, MAC_PROCESSING_CORE_2, FAPI_PROCESSING_ CORE_2 are disabled. Similarly, all flags for core_3 and core_4 are disabled. Therefore, the clock rate in core_1 turns moderate. However, the clock rate in core_2, core_3, and core_4 becomes idle. Therefore, the power of core_2, core_3, and core_4 are saved. The example embodiment is applicable for the VoIP Call scenario, which requires low throughput in each stage of the incoming packets.

Figure 12A:
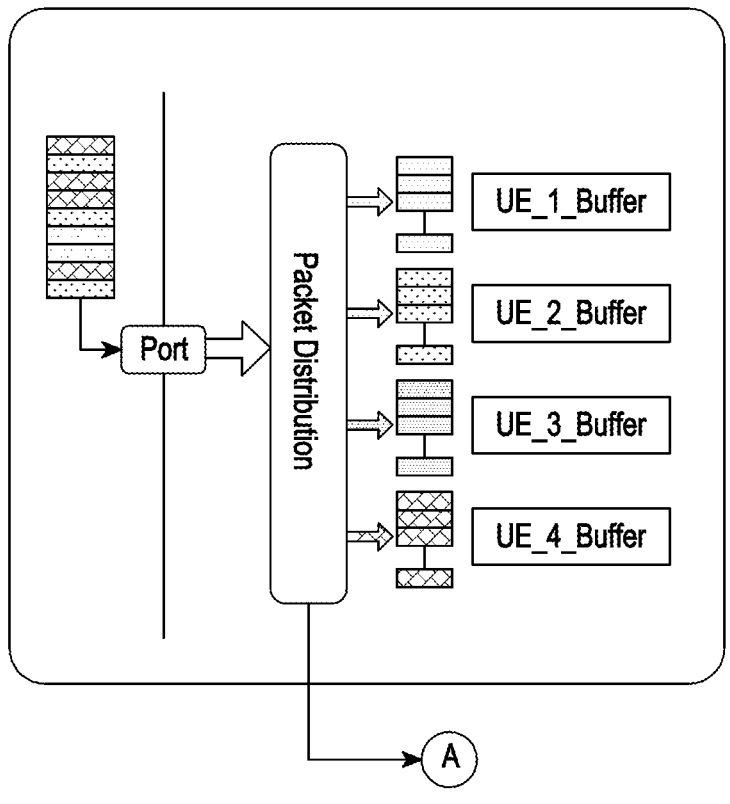
FIGS. 12A and 12B are a flowchart illustrating an example method for dynamically distributing incoming packets from UEs to at least one buffer of a core corresponding to an RT thread, according to various embodiments.
Figure 12B:
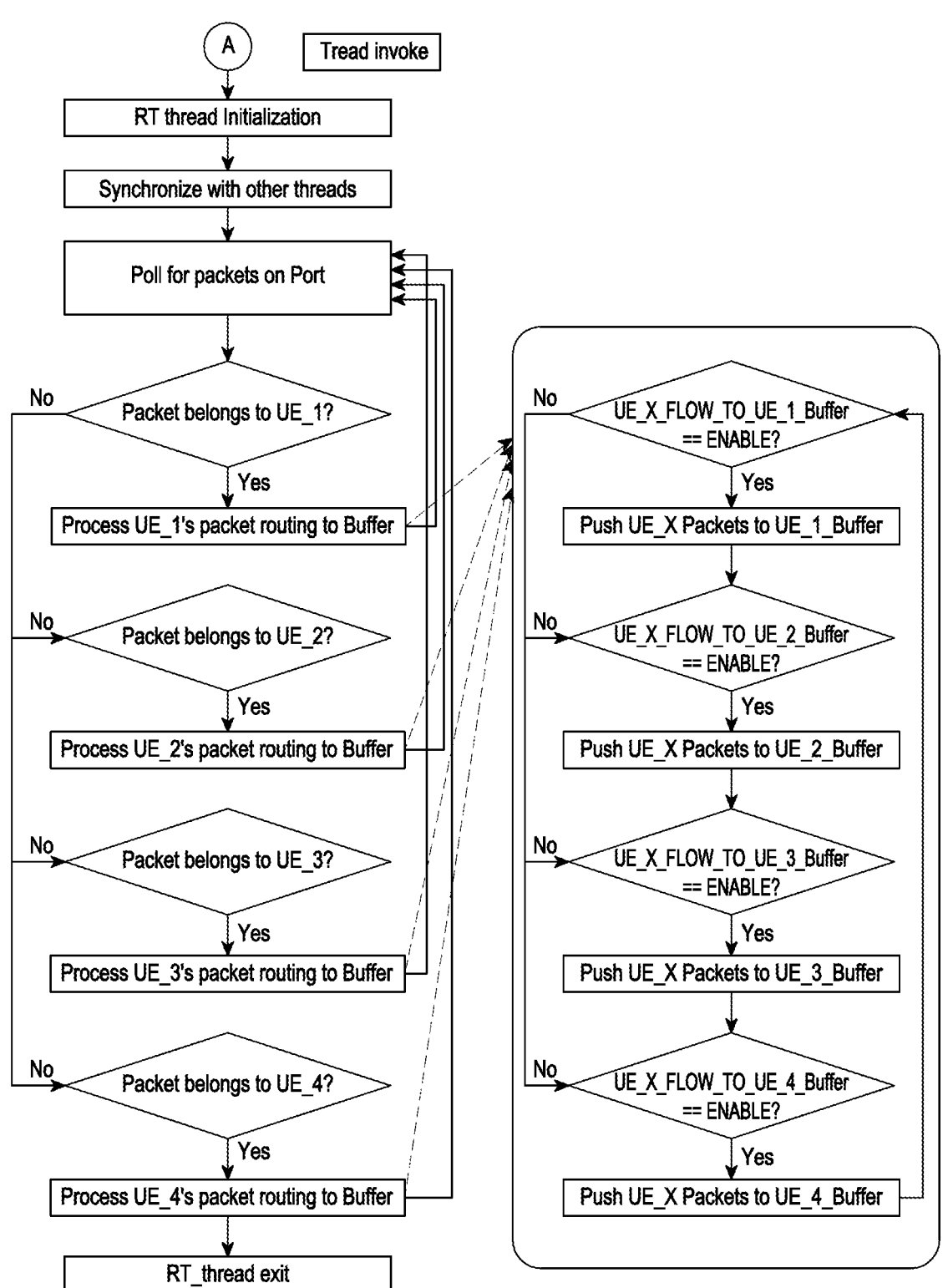

FIGS. 12A and 12B are a flowchart illustrating an example method for dynamically distributing incoming packets from UEs to at least one buffer of a core corresponding to a RT thread, according to various embodiments. FIGS. 12A and 12B relate to dynamically load scheduling in case of the 'data decomposition' of the incoming packets. In an embodiment, the incoming packets are directed towards any 'dynamically decided' UE (user) buffers, unlike routing to the packet buffer which is dedicated for the specific UE (users)'s flow. As a non-limiting example, incoming packets from UE #1 (user equipment 1) may be dynamically distributed to any one of the buffers—UE_1_Buffer, or UE_2_Buffer, or UE_3_Buffer, or UE_4_Buffer, unlike only assigned to dedicated buffer UE_1_Buffer for the incoming packets from UE #1.

In an embodiment, the incoming packets are received from user requests of a plurality of UEs. A ratio of an egress data-rate with respect to the ingress data-rate of one or more incoming data packets is determined (806) by the RL agent. The ingress data-rate relates to the one or more incoming packets in the buffer of the corresponding cores, and the egress data-rate relates to outgoing packets from the buffer of the corresponding core after completion of the processing of the one or more packets. Upon determining the ratio, and based on CPU load on each core, a flag is enabled or disabled corresponding to each RT thread (808) by the RL agent for dynamically distributing the incoming packets in any of the buffers, instead of assigning them to the dedicated buffer for the corresponding UEs. Subsequently, the at least one buffer of the plurality of cores is determined (810) by the RL agent for processing the one or more incoming packets based on the corresponding enabled flags. Further, at 812, the one or more incoming packets are processed based on the at least one determined buffer.

Therefore, the RL agent monitors the incoming packet rate for each UE (user's) flow and outgoing packet rate from each buffer after processing the packets, and thereby dynamically decides which UE's incoming packets should be directed to which UE's packet buffer. As shown in FIGS. 12A and 12B, incoming data packets in a port may be distributed by the packet distributor to any of the UE_1_Buffer, UE_2_Buffer, UE_3_Buffer, or UE_4_Buffer, based on the determined ratio and the CPU load on each of the plurality of cores. In a non-limiting example, the 'RL Agent' monitors CPU load on each of the plurality of cores and the ratio of each buffer, and thereby enables at least one of the below flags:

UE_X_FLOW_TO_UE_1_Buffer
UE_X_FLOW_TO_UE_2_Buffer
UE_X_FLOW_TO_UE_3_Buffer
UE_X_FLOW_TO_UE_4_Buffer
Note: X represents UE # of incoming packet X can be anything between 1 to 4
As an example, once the UE_2_FLOW_TO_UE_1_Buffer is enabled, then the incoming packets from UE #2 route to the UE_1_Buffer, instead of routing the incoming packets of UE #2 to the UE_2_Buffer. Similarly, if UE_4_FLOW_TO_UE_3_Buffer is enabled, then the incoming packets from UE #4 route to the UE_3_Buffer. Thus, the polling process (as disclosed in 606) continuously monitors if incoming packets are available in the corresponding buffer, and once the incoming packets are available, the corresponding RT threads of the core process the incoming packets.

In various embodiments, the RL agent monitors the input packet buffer fill level of each UE, e.g., the ingress data-rate, as the state. Further, the RL agent enables the above flags as the action. Furthermore, the RL agent monitors the ratio of egress data-rate to ingress data-rate and core utilizations for each UE as the reward. Hence, the RL agent determines where to (which packet buffer) direct the packets of any given UE. Thus, it addresses the problem of performance bottleneck due to 'imbalanced data decomposition'. In various embodiments, a throughput of the multi-core processing unit and occupancy status of one or more buffers based on the one or more incoming packets are determined by the RL agent. If it is determined that the throughput of the multi-core processing unit is greater than a first pre-defined threshold value and the occupancy status of the one or more buffers is greater than a second pre-defined threshold value, the enabled flag is disabled for reducing a load on the plurality of cores, a power consumed by the plurality of cores, and congestion in the one or more buffers by the RL agent. The first pre-defined threshold and the second pre-defined threshold value may be any value, which defines the cut-off value for disabling the enabled flag.

Figure 13:
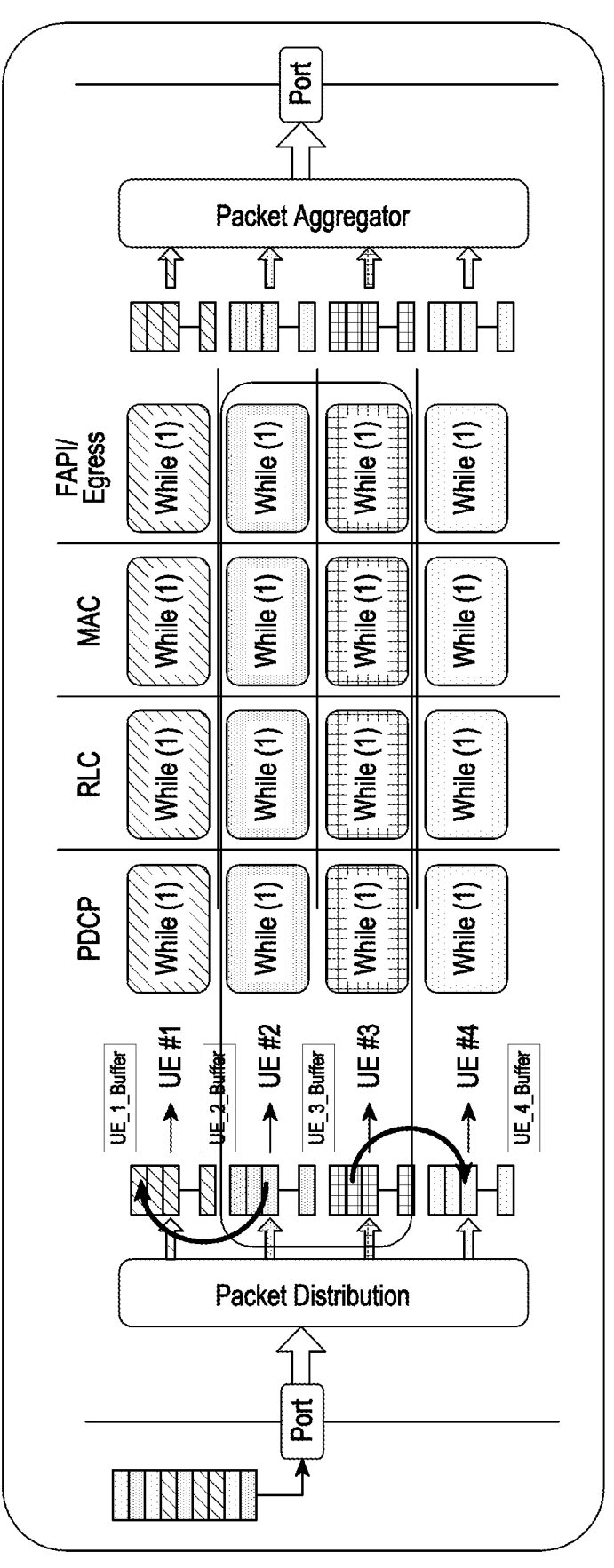
FIG. 13 is a diagram illustrating an example scenario for dynamically distributing incoming packets to different user-buffer, according to various embodiments.

FIG. 13 is a diagram illustrating an example scenario for dynamically distributing incoming packets to different user-buffer, according to various embodiments. As per the example scenario, the incoming packets from UE #2 and UE #3 are initially assigned to the corresponding UE #2_Buffer and UE #3_Buffer respectively. However, if the ratio of egress data-rate and ingress data-rate is less than 0.5, then the rate of incoming packets is high in respect of the processing of the packets. In such scenario, the RL agent dynamically distributes the incoming packets from UE #2 to the UE #1_Buffer, and the incoming packets from UE #3 to the UE #4_Buffer for processing the data packets in the RT threads different from the initialized RT threads. Therefore, the RL agent may enable the following flags to accomplish the dynamic assignment:

UE_2_FLOW_TO_UE_1=ENABLE
UE_3_FLOW_TO_UE_4=ENABLE

Thus, the incoming packets from UE #2 are assigned to UE #1_Buffer. Similarly, the incoming packets from UE #3 are assigned to UE #4_Buffer. Also, all other flags are in disabled status.

A flowchart illustrating an example method is described with reference to FIG. 14 of the drawings disclosing an example method for real-time multi-core load scheduling in an operating system (OS) less communication network, according to various embodiments. FIG. 14 relates to dynamically distributing execution for 'data decomposition' and 'functional decomposition'.

The method 1400 comprises initializing (at 1402), RT threads 718, executing on the multi-core processing unit including a plurality of cores 714 for processing one or more user requests from a plurality of user equipment (UEs) 702. Each of the user requests assigned to one or more dedicated buffers of plurality of cores of the multi-core processing unit 714 includes a request for processing of one or more incoming packets. Further, the RT threads 718 are configured to run on the plurality of cores for processing the one or more corresponding functionalities associated with the one or more incoming packets. Therefore, dedicated buffers are initialized for dedicated user requests, and the RT threads 718 are initialized to execute corresponding functionalities of the one or more incoming packets.

At 1404, method 1400 further comprises synchronizing the RT threads 718 with each other for simultaneous processing of the one or more incoming packets.

At 1406, the method 1400 further includes determining a CPU load on each of the plurality of cores of the multi-core processing unit 714, and an occupancy level of the one or more buffers of the plurality of cores for processing the one or more incoming packets by dynamically distributing the one or more incoming packets to the one or more buffers or the RT threads 718. For example, the multi-core processing unit 714 is configured to run the RL agent 716 in at least one core of the plurality of cores. The RL agent 716 determines the CPU load on each of the plurality of cores of the multi-core processing unit and the occupancy level of the one or more buffers of the plurality of cores. The occupancy level of the one or more buffers comprises a difference between an ingress data-rate that relates to the one or more incoming packets in the one or more buffers and the egress data-rate that relates to one or more outgoing packets from the one or more buffers.

At 1408, the method 1400 further comprises enabling or disabling a first flag corresponding to each thread for the corresponding functionalities based on the determined load on each of the plurality of cores. The corresponding first flags are enabled by the RL agent 716 based on monitoring the core load across all the cores running RT threads and based on the load, and thereafter balances the load for minimum power consumption by enabling or disabling the corresponding first flags. The first flag may be defined as:

PDCP_PROCESSING_CORE_X
RLC_PROCESSING_CORE_X
MAC_PROCESSING_CORE_X
FAPI_PROCESSING_CORE_X
Note: X represents CPU Core #
X: 1 to 4 are the pipelined CPU-cores for UE #1
X: 5 to 8 are the pipelined CPU-cores for UE #2
X: 9 to 11 are the pipelined CPU-cores for UE #3
X: 12 to 16 are the pipelined CPU-cores for UE #4

In an example, if the first flag PDCP_PROCESSING_CORE_4 is enabled, then PDCP stages/functionalities of incoming packets from UE #1 are processed by core_4 of the multi-core processing unit.

At 1410, the method 1400 further comprises enabling or disabling a second flag for distribution of the incoming packets across different one or more buffers based on the determined occupancy level of the one or more buffers. The at least one second flag is enabled by the RL agent 716 based on monitoring the buffer occupancy levels and the buffer level, distributed the incoming packets across different buffers, by enabling or disabling the at least one second flag as mentioned below:

UE_X_FLOW_TO_UE_1_Buffer
UE_X_FLOW_TO_UE_3_Buffer
UE_X_FLOW_TO_UE_2_Buffer
UE_X_FLOW_TO_UE_4_Buffer
Note: X represents UE # of incoming packet X can be anything between 1 to 4.

As an example, if the second flag UE_4_FLOW_TO_UE_1_Buffer is enabled, then incoming packets from UE #4 are routed to the buffer initialized for UE #1, instead of the incoming packet of UE #4 is routed to the buffer for UE #4.

At 1412, the method 1400 further comprises determining one RT thread among the RT threads based on the corresponding enabled first flags for processing the one or more incoming packets.

At 1414, the method 1400 further comprises determining o at least one buffer among the plurality of buffers based on the enabled second flag. The at least one RT thread or at least one buffer is determined by the RL agent 716 based on the at corresponding enabled first flags and at least one enabled second flag, respectively.

At 1416, the method 1400 further comprises processing the one or more incoming packets based on each of the at least one determined flag and the at least one determined buffer.

Figure 15:
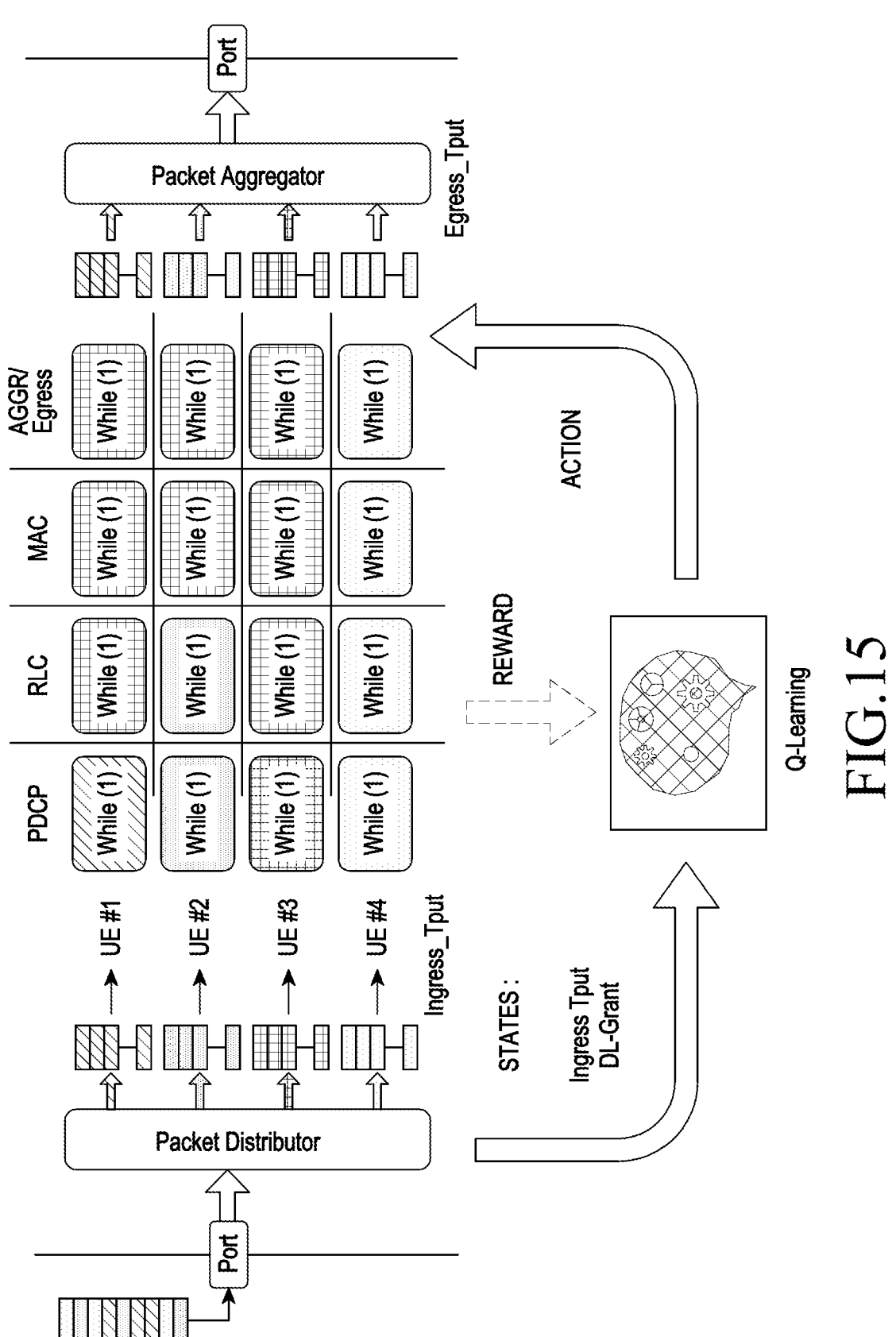
FIG. 15 is a diagram illustrating example actions, rewards, and states for a pre-trained prediction unit, RL agent, according to various embodiments.

FIG. 15 is a diagram illustrating example actions, rewards, and states for a pre-trained prediction unit, RL agent, according to various embodiments.

In an embodiment, for dynamically load scheduling in case of the 'functional decomposition' of the incoming packets, the ingress data-rate may be defined as the state of the system under learning for the pre-trained prediction unit. The state may be defined as 'LOW, 'MID, or 'HIGH' based on the ingress data-rate. Further, the action may be defined as enabling or disabling the flag for dynamically distributing processing of the one or more corresponding functionalities associated with the incoming packets. Thus, the flag for enabling or disabling may be defined as below:

PDCP_PROCESSING_CORE_1=ENABLE/DISABLE
RLC_PROCESSING_CORE_2=ENABLE/DISABLE
MAC_PROCESSING_CORE_3=ENABLE/DISABLE
FAPI_PROCESSING_CORE_4=ENABLE/DIS ABLE

Further, the determination of the load or performance on each of the cores of the multi-core processing unit is defined as the one or more rewards received by the pre-trained prediction model. The rewards may be defined as "good reward", and "bad reward". In case of "good reward", the ratio of "Egress Packet rate/Ingress Packet rate" is 1. However, in case of "bad reward", the ratio of "Egress Packet rate/Ingress Packet rate" is less than 0.5. Further, power consumption by measuring the clock rate of the core may also be defined as a reward. The power consumption below a threshold may be considered a good reward, and the power consumption above a threshold may be considered a bad reward.

TABLE 3

| | Q Table for CORE 1 | | | | | | | |
| --- | --- | --- | --- | --- | --- | --- | --- | --- |
| ACTIONS/ | PDCP_PROCESSING_CORE_1 | | RLC_PROCESSING_CORE_1 | | MAC_PROCESSING_CORE_1 | | FAPI_PROCESSING_CORE_1 | |
| STATES | ENABLE | DISABLE | ENABLE | DISABLE | ENABLE | DISABLE | ENABLE | DISABLE |
| State#1 LOW Ingress Packet Rate | Best: +1 Worst: −1 | Best: +1 Worst: −1 | Best: +1 Worst: −1 | Best: +1 Worst: −1 | Best: +1 Worst: −1 | Best: +1 Worst: −1 | Best: +1 Worst: −1 | Best: +1 Worst: −1 |
| State#2 MID Ingress Packet Rate | Best: +1 Worst: −1 | Best: +1 Worst: −1 | Best: +1 Worst: −1 | Best: +1 Worst: −1 | Best: +1 Worst: −1 | Best: +1 Worst: −1 | Best: +1 Worst: −1 | Best: +1 Worst: −1 |
| State#3 HIGH Ingress Packet Rate | Best: +1 Worst: −1 | Best: +1 Worst: −1 | Best: +1 Worst: −1 | Best: +1 Worst: −1 | Best: +1 Worst: −1 | Best: +1 Worst: −1 | Best: +1 Worst: −1 | Best: +1 Worst: −1 |

Table 3 discloses Q-Table only for CORE 1. In actuality, it is extended for all CPU-Cores. For each of the ingress data-rate the best reward is considered as +1 and the worst reward is considered as −1.

In an embodiment, for dynamically load scheduling in case of the 'data decomposition' of the incoming packets, the ingress data-rate or packet buffer level is defined as a state of the system under learning for the pre-trained prediction unit. The states of the system may be considered as 'LOW full', 'MID full', and 'MAX full'. That is the buffer is low full, mid full, and the max full. Further, the action may be defined as enabling or disabling the flag for dynamically distributing incoming packets to different buffers. Thus, the flag for enabling or disabling may be defined as below:

UE_X_FLOW_TO_UE_1_Buffer=ENABLE/DISABLE
UE_X_FLOW_TO_UE_2_Buffer=ENABLE/DISABLE
UE_X_FLOW_TO_UE_3_Buffer=ENABLE/DISABLE
UE_X_FLOW_TO_UE_4_Buffer=ENABLE/DISABLE The ratio of the egress data-rate with respect to the ingress data-rate, and the utilization of each core is defined as the one or more rewards. If the ratio is equal to 1, it is considered a good reward. Similarly, if the ratio is less than 0.5, then it is considered a bad reward. Further, core utilization may be determined to find our reward for the action taken on the current state of the system. Measuring RT thread utilization of CPU core can be determined without calling any OS APIs/Services. RT thread utilization may be measured as:

$$\left[ 100 - \frac{\text{while [1] time of RT\_thread with packets unavailable} \times 100}{\text{Total spin time } (ex{:}1 \ \text{second})} \right]$$

In the case of RT thread utilization, the good reward may be considered as CPU Utilization of all the UE's RT threads that is deviating LESS than 10% (Imbalance rate). The bad reward is considered as CPU Utilization of all the UE's RT threads deviating MORE than 10% (Imbalance rate).

TABLE 4

| Q_Table for CORE 1 | | | | |
|---|---|---|---|---|
| ACTIONS/ | UE_X_FLOW_TO_UE_1_Buffer | | UE_X_FLOW_TO_UE_2_Buffer | |
| STATES | ENABLE | DISABLE | ENABLE | DISABLE |
| State#1 LOW buffer full | Best: +1 Worst: −1 | Best: +1 Worst: −1 | Best: +1 Worst: −1 | Best: +1 Worst: −1 |
| State#2 MID buffer full | Best: +1 Worst: −1 | Best: +1 Worst: −1 | Best: +1 Worst: −1 | Best: +1 Worst: −1 |
| State#3 HIGH buffer full | Best: +1 Worst: −1 | Best: +1 Worst: −1 | Best: +1 Worst: −1 | Best: +1 Worst: −1 |

| Q_Table for CORE 1 | | | | |
|---|---|---|---|---|
| ACTIONS/ | UE_X_FLOW_TO_UE_3_Buffer | | UE_X_FLOW_TO_UE_4_Buffer | |
| STATES | ENABLE | DISABLE | ENABLE | DISABLE |
| State#1 LOW buffer full | Best: +1 Worst: −1 | Best: +1 Worst: −1 | Best: +1 Worst: −1 | Best: +1 Worst: −1 |
| State#2 MID buffer full | Best: +1 Worst: −1 | Best: +1 Worst: −1 | Best: +1 Worst: −1 | Best: +1 Worst: −1 |
| State#3 HIGH buffer full | Best: +1 Worst: −1 | Best: +1 Worst: −1 | Best: +1 Worst: −1 | Best: +1 Worst: −1 |

Table 4 discloses Q-Table for UE X. In actuality, it is extended for all UEs (X=1 to 4). For each of the buffer full states, the best reward is considered as +1 and the worst reward is considered as −1.

In view of the above-described scenarios, the method and system of the present disclosure provide various advantages such as improvement in the core performance with an optimal number of cores, avoiding localized performance bottlenecks on one or few cores by sharing the load across the various buffers and task-isolated threads. The present disclosure saves power by distributing incoming packets to RT threads based on the load on each core and improves the thermal performance of the processing cores by avoiding localized high loads on plurality of cores.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for multi-core load scheduling for functional decomposition of incoming packets in an operating system (OS) less communication network, comprising:

initializing a plurality of threads, and executing on a multi-core processing unit including a plurality of cores, for processing corresponding functionalities associated with one or more incoming packets received from a plurality of user equipment (UEs);

synchronizing the plurality of initialized threads with each other for simultaneous processing of the one or more incoming packets;

executing a reinforcement learning (RL) agent in at least one core of the multi-core processing unit, and determining, by the RL agent, a central processing unit (CPU) load on each of the plurality of cores, and an ingress data-rate of the one or more incoming packets;

enabling or disabling, by the RL agent based on each of the determined CPU load and the ingress data-rate, a flag corresponding to each of the plurality of threads for processing the corresponding functionalities associated with the one or more incoming packets;

determining at least one thread among the plurality of threads based on the corresponding enabled flag; and processing the corresponding functionalities associated with the one or more incoming packets based on the at least one determined thread, wherein the plurality of threads are configured to run on the plurality of cores of the multi-core processing unit, wherein each of the plurality of cores is responsible for processing a functionality associated with the one or more incoming packets of each UE, and wherein the functionality associated with the one or more incoming packets of each UE comprises one of a packet data convergence protocol (PDCP) stage, a radio resource control (RLC) stage, a medium access control (MAC) stage, and a functional application platform interface (FAPI) stage.

2. The method as claimed in claim 1, wherein the RL agent corresponds to a pre-trained prediction unit.

3. The method as claimed in claim 2, wherein the pre-trained prediction unit is configured to perform a closed loop learning method for a system under learning, and wherein the closed loop learning method includes:

defining a policy based on a plurality of options related to an action available in a given state of the system under learning;

performing the action based on the defined policy;

fine tuning the performed action based on one or more rewards received by the pre-trained prediction unit and the performed action; and generating a table based on the performed action and the one or more rewards in different states of the system under learning.

4. The method as claimed in claim 3, wherein the plurality of options includes a definition related to a learning of the pre-trained prediction unit with respect to the action performed by the pre-trained prediction unit in real-time, and the fine tuning is performed until a reception of an optimized reward.

5. The method as claimed in claim 3, wherein the enabling or disabling of the flag includes the action performed by the pre-trained prediction unit;

wherein the ingress data-rate determined by the pre-trained prediction unit includes the state of the system; and wherein the determination of the CPU load on each of the plurality of cores includes the one or more rewards received by the pre-trained prediction unit.

6. The method as claimed in claim 1, wherein the ingress data-rate relates to the one or more incoming data packets in a buffer of each of the plurality of cores.

7. The method as claimed in claim 1, wherein, for determining the at least one thread, the method further comprises:

determining each of core load conditions, a throughput, a thermal efficiency, and a power optimization level of the multi-core processing unit.

8. The method as claimed in claim 1, further comprising:

determining a throughput of the multi-core processing unit based on a type of the one or more incoming packets; and disabling, based on determining that the throughput of the multi-core processing unit is greater than a specified threshold value, an enabled flag for reducing a CPU load on the plurality of cores, and a power consumed by the plurality of cores.

9. The method as claimed in claim 1, wherein the one or more incoming packets correspond to one or more user requests from the plurality of UEs, wherein the one or more incoming packets correspond to each of the one or more user requests and are initialized to a plurality of dedicated cores, and the method further comprises:

determining a ratio of an egress data-rate with respect to an ingress data-rate of the one or more incoming packets;

enabling or disabling, based on the determined ratio and the CPU load on each of the plurality of cores, the flag for processing of the one or more incoming packets corresponding to each of the one or more user requests by dynamically distributing to at least one buffer of a plurality of cores different from the initialized dedicated cores; and determining the at least one buffer among the plurality of buffers based on the corresponding enabled flag; and processing the one or more incoming packets based on the at least one determined buffer.

10. The method as claimed in claim 1, wherein the ingress data-rate relates to the one or more incoming packets in the buffer to be processed by the corresponding core, and the egress data-rate relates to outgoing packets from the buffer of the corresponding core after completion of the processing of the one or more packets.

11. The method as claimed in claim 1, wherein the enabling or disabling of the flag of the one or more incoming packets includes the action performed by a pre-trained prediction unit;

wherein the ingress data-rate determined by the pre-trained prediction unit includes the state of the system under learning; and wherein determining the ratio of the egress data-rate with respect to the ingress data-rate, and the utilization of each core includes the one or more rewards that are received by the pre-trained prediction unit in response to one or more performed actions.

12. The method as claimed in claim 9, further comprising:

determining a throughput of the multi-core processing unit and an occupancy status of a plurality of buffers based on the one or more incoming packets; and disabling, based on determining that the throughput of the multi-core processing unit is greater than a first specified threshold value and the occupancy status of the plurality of buffers is greater than a second specified threshold value, the enabled flag for reducing a CPU load on the plurality of cores, a power consumed by the plurality of cores, and a congestion in the plurality of buffers.

13. A method for multi-core load scheduling in an operating system (OS) less communication network, comprising:

initializing a plurality of threads, and executing on a multi-core processing unit including a plurality of cores, for processing one or more user requests from a plurality of user equipment (UEs);

synchronizing the plurality of initialized threads with each other for simultaneous processing of one or more incoming packets;

executing a reinforcement learning (RL) agent in at least one core of the multi-core processing unit, and determining, by the RL agent, a central processing unit (CPU) load on each of the plurality of cores, and an occupancy level of a plurality of buffers of the plurality of cores for processing the one or more incoming packets by dynamically distributing the one or more incoming packets to the plurality of buffers or the plurality of threads;

enabling or disabling, by the RI agent, a first flag corresponding to each of the plurality of threads for corresponding functionalities based on the determined CPU load on each of the plurality of cores;

enabling or disabling, by the RL agent, a second flag for distribution of the one or more incoming packets across the plurality of buffers based on the determined occupancy level of the plurality of buffers;

determining at least one thread among the plurality of threads based on the corresponding enabled first flag;

determining at least one buffer among the plurality of buffers based on the enabled second flag; and processing the one or more incoming packets based on each of the at least one determined thread and the at least one determined buffer, wherein each of the one or more user requests includes a request for processing of the one or more incoming packets, and wherein the plurality of threads are configured to run on the plurality of cores for processing the corresponding functionalities associated with the one or more incoming packets, and wherein each functionality associated with each of the one or more incoming packets comprise one of a packet data convergence protocol (PDCP) stage, a radio resource control (RLC) stage, a medium access control (MAC) stage, and a functional application platform interface (FAPI) stage.

14. The method as claimed in claim 13, wherein the occupancy level of the plurality of buffers comprises a difference between an ingress data-rate relating to the one or more incoming packets in the plurality of buffers and the egress data-rate relating to one or more outgoing packets from the plurality of buffers.

15. A network entity for load scheduling for functional decomposition of incoming packets in a communication network, comprising:

an operating system (OS) less multi-core processing unit, comprising at least one processor comprising processor circuitry, configured individually and/or cooperatively, to receive one or more user requests from a plurality of user equipments (UEs), wherein the OS less multi-core processing unit is configured to:

initialize a plurality of threads, and executing on the multi-core processing unit including a plurality of cores, for processing corresponding functionalities associated with one or more incoming packets received from the plurality of UEs;

synchronize the plurality of initialized threads with each other for simultaneous processing of the one or more incoming packets;

execute a reinforcement learning (RL) agent in at least one core of the multi-core processing unit, and determine, by the RL agent, a central processing unit (CPU) load on each of the plurality of cores, and an ingress data-rate of the one or more incoming packets;

enable or disable, by the RL agent based on each of the determined CPU load and the ingress data-rate, a flag corresponding to each of the plurality of threads for processing the corresponding functionalities associated with the one or more incoming packets;

determine at least one thread among the plurality of threads based on the corresponding enabled flag; and process the corresponding functionalities associated with the one or more incoming packets based on the at least one determined thread, wherein the plurality of threads are configured to run on the plurality of cores of the multi-core processing unit, wherein each of the plurality of cores is responsible for processing a functionality associated with the one or more incoming packets of each UE, and wherein the functionality associated with the one or more incoming packets of each UE comprises one of a packet data convergence protocol (PDCP) stage, a radio resource control (RLC) stage, a medium access control (MAC) stage, and a functional application platform interface (FAPI) stage.

16. The network entity as claimed in claim 15, wherein the one or more incoming packets corresponds to one or more user requests from the plurality of UEs, wherein one or more incoming packets corresponding to each of the one or more user requests and are initialized to plurality of dedicated cores, and wherein the OS less multi-core processing unit is further configured to:

determine a ratio of an egress data-rate with respect to an ingress data-rate of the one or more incoming packets;

enable or disable, based on the determined ratio and the CPU load on each core, the flag for processing of the one or more incoming packets corresponding to each of the one or more user requests by dynamically distributing to at least one buffer of a plurality of cores different from the initialized dedicated cores; and determine the at least one buffer among the plurality of buffers based on the corresponding enabled flag; and process the one or more incoming packets in the at least one determined buffer.

17. A network entity for load scheduling for functional decomposition of incoming packets in a communication network, comprising:

an operating system (OS) less multi-core processing unit comprising at least one processor comprising processor circuitry, configured individually and/or cooperatively to receive one or more user requests from a plurality of user equipments (UEs), wherein the OS less multi-core processing unit is configured to:

initialize a plurality of threads, and executing on the multi-core processing unit including a plurality of cores, for processing one or more user requests from a plurality of UEs;

synchronize the plurality of initialized threads with each other for simultaneous processing of the one or more incoming packets;

execute a reinforcement learning (RL) agent in at least one core of the multi-core processing unit, and determine, by the RL agent, a central processing unit (CPU) load on each of the plurality of cores, and an occupancy level of a plurality of buffers of the plurality of cores for processing the one or more incoming packets by dynamically distributing the one or more incoming packets to the plurality of buffers or the plurality of threads;

enable or disable, by the RL agent, a first flag corresponding to each of the plurality of threads for corresponding functionalities based on the determined CPU load on each of the cores;

enable or disable, by the RL agent, a second flag for distribution of the one or more incoming packets across the plurality of buffers based on the determined occupancy level of the plurality of buffers;

determine at least one thread among the plurality of threads based on the corresponding enabled first flags;

determine at least one buffer among the plurality of buffers based on the enabled second flag; and process the one or more incoming packets based on each of the at least one determined thread and the at least one determined buffer, wherein each of the one or more user requests includes a request for processing of the one or more incoming packets, and wherein the plurality of threads are configured to run on the plurality of cores for processing the corresponding functionalities associated with the one or more incoming packets, and wherein each functionality associated with each of the one or more incoming packets comprise one of a packet data convergence protocol (PDCP) stage, a radio resource control (RLC) stage, a medium access control (MAC) stage, and a functional application platform interface (FAPI) stage.

18. The network entity as claimed in claim 17, wherein the occupancy level of the plurality of buffers comprises a difference between an ingress data-rate relating to the one or more incoming packets in the plurality of buffers and the egress data-rate relating to one or more outgoing packets from the plurality of buffers.

* * * * *